(12) United States Patent
Yap

(10) Patent No.: US 9,882,654 B1
(45) Date of Patent: Jan. 30, 2018

(54) JAMMER-SUPPRESSED PHOTONIC-ENABLED RF LINK

(71) Applicant: HRL Laboratories, LLC, Malibu, CA (US)

(72) Inventor: Daniel Yap, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/073,131

(22) Filed: Mar. 17, 2016

(51) Int. Cl.
| | |
|---|---|
| *H04B 10/00* | (2013.01) |
| *H04B 10/24* | (2006.01) |
| *H04B 1/06* | (2006.01) |
| *H04B 10/69* | (2013.01) |
| *H04B 10/2575* | (2013.01) |
| *H04B 10/516* | (2013.01) |
| *H04B 10/50* | (2013.01) |

(52) U.S. Cl.
CPC ....... *H04B 10/697* (2013.01); *H04B 10/2575* (2013.01); *H04B 10/503* (2013.01); *H04B 10/516* (2013.01)

(58) Field of Classification Search
None
See application file for complete search history.

(56) References Cited

U.S. PATENT DOCUMENTS

| | | | | |
|---|---|---|---|---|
| 4,028,702 A | * | 6/1977 | Levine | H01Q 3/2676 342/374 |
| 5,001,336 A | * | 3/1991 | de la Chapelle | H04B 10/50 250/208.2 |
| 5,153,762 A | * | 10/1992 | Huber | H04B 10/272 348/E7.094 |
| 5,404,006 A | * | 4/1995 | Schaffner | G02B 6/42 250/208.2 |
| 5,930,031 A | * | 7/1999 | Zhou | G02B 6/12004 359/344 |
| 6,628,849 B2 | * | 9/2003 | Yap | G02F 1/3136 385/27 |
| 7,053,814 B2 | | 5/2006 | Yap | |
| 7,085,499 B2 | * | 8/2006 | Yap | G02B 6/2861 398/161 |
| 7,088,886 B2 | | 8/2006 | Mangir et al. | |

(Continued)

OTHER PUBLICATIONS

D. Yap and W. W. Ng, in "Self-adapting limiter," Digest 2004 International Topical Meeting on Microwave Photonics (MWP'04), pp. 193-195, IEEE (2004).

(Continued)

*Primary Examiner* — Oommen Jacob
(74) *Attorney, Agent, or Firm* — Ladas & Parry

(57) ABSTRACT

A radio frequency (RF) link includes a link transmitter that includes a data modulator for modulating a data waveform together with an RF carrier, a photonic encoder coupled to the data modulator, and a transmitter antenna for transmitting an RF signal, wherein the RF signal comprises an output of the photonic encoder, and a link receiver including a receiver antenna for receiving the RF signal, a first laser source, a photonic limiter coupled to the first laser source and to the receiving antenna, a photonic decoder coupled to the photonic limiter, a photo-receiver coupled to the photonic decoder, and a demodulator coupled to the photo-receiver for demodulating an output of the photo-receiver with the RF carrier to form a data output.

28 Claims, 18 Drawing Sheets

(56) References Cited

U.S. PATENT DOCUMENTS

| | | | |
|---|---|---|---|
| 7,130,113 B2* | 10/2006 | Shakir | G02B 27/108 359/298 |
| 7,162,156 B2* | 1/2007 | Frey | H04B 10/2503 398/107 |
| 7,167,614 B2 | 1/2007 | Mangir et al. | |
| 7,266,269 B2* | 9/2007 | Koste | G02B 6/4277 385/40 |
| 7,440,699 B1* | 10/2008 | Stewart, II | H04B 10/25756 398/116 |
| 7,446,696 B2* | 11/2008 | Kondo | G01S 7/35 180/167 |
| 7,499,653 B2* | 3/2009 | Yap | G02F 2/002 398/115 |
| 7,555,219 B2* | 6/2009 | Cox | H04B 1/48 398/116 |
| 7,650,080 B2* | 1/2010 | Yap | G02F 2/02 398/161 |
| 7,657,132 B1* | 2/2010 | Yap | G02F 1/035 385/1 |
| 7,822,082 B2* | 10/2010 | Ng | H01S 5/02248 372/20 |
| 7,835,600 B1* | 11/2010 | Yap | G01R 29/0885 385/1 |
| 7,864,396 B1* | 1/2011 | Sayyah | B82Y 20/00 359/248 |
| 8,059,969 B1* | 11/2011 | Yap | H04B 10/25759 398/140 |
| 8,180,183 B1* | 5/2012 | Yap | H01Q 13/00 343/772 |
| 8,285,147 B2* | 10/2012 | Beckett | H04B 10/505 398/182 |
| 8,682,170 B2* | 3/2014 | Prucnal | H04B 1/109 398/115 |
| 8,693,875 B2* | 4/2014 | Banwell | H04B 10/25759 398/115 |
| 8,750,709 B1* | 6/2014 | Schaffner | H04B 10/90 398/115 |
| 8,995,838 B1* | 3/2015 | Schaffner | H01Q 13/02 398/116 |
| 9,250,452 B1* | 2/2016 | Yap | G02B 6/4279 |
| 9,316,534 B1* | 4/2016 | Kondratko | H04B 10/66 |
| 9,335,568 B1* | 5/2016 | Yap | G02F 1/011 |
| 9,479,253 B2* | 10/2016 | Liu | H04B 10/25752 |
| 9,548,878 B2* | 1/2017 | Gupta | H04L 27/2096 |
| 2003/0090777 A1* | 5/2003 | Yap | H01Q 3/2676 359/333 |
| 2004/0136649 A1* | 7/2004 | Mangir | H04B 10/2537 385/27 |
| 2005/0156778 A1* | 7/2005 | Yap | G01S 13/288 342/54 |
| 2009/0232507 A1* | 9/2009 | Gupta | H04L 27/2096 398/115 |
| 2014/0022119 A1* | 1/2014 | Lohr | G01S 13/86 342/25 R |

OTHER PUBLICATIONS

B. J. Eggleton, C. G. Poulton and R. Pant in "Inducing and harnessing stimulated Brillouin scattering in photonic integrated circuits," Advances in Optics and Photonics, 5, 536-578 (2013).

* cited by examiner

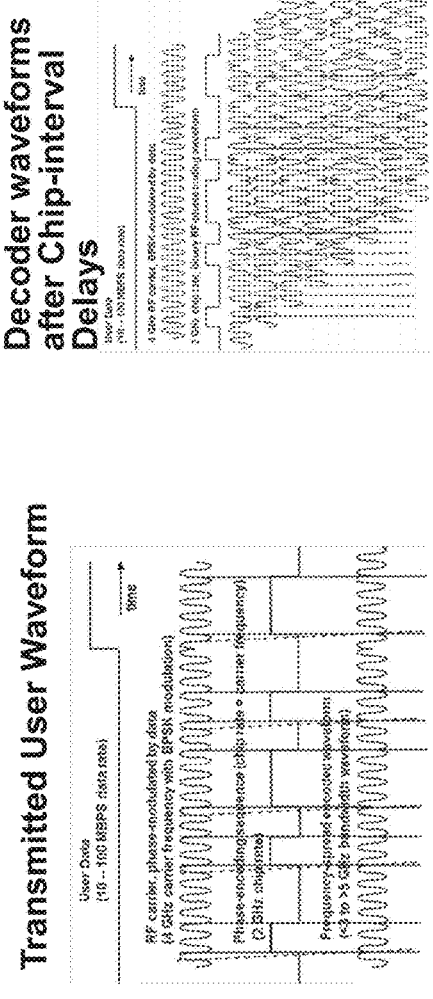
FIG. 13A Transmitted User Waveform
FIG. 13B Decoder waveforms after Chip-interval Delays
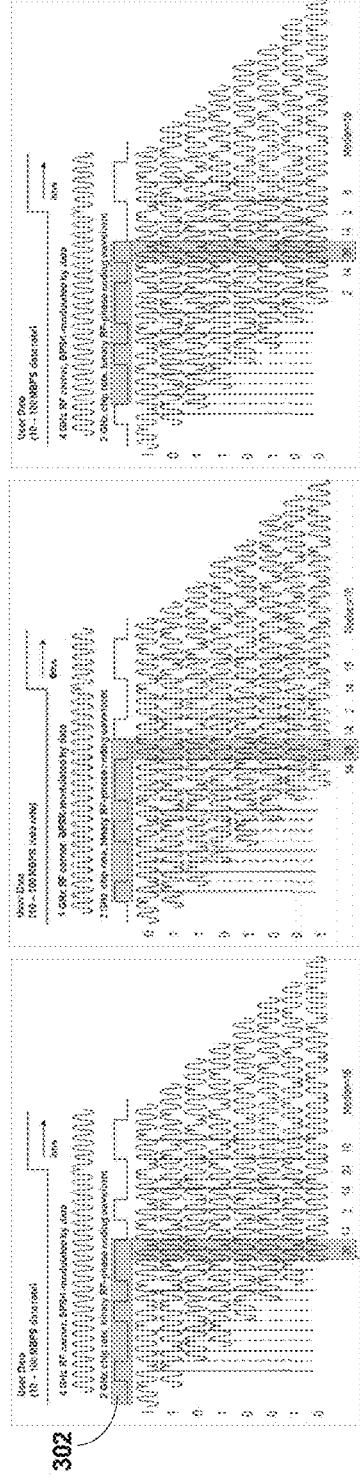
FIG. 13C
FIG. 13D
FIG. 13E
Decoder Waveforms after RF-phase reversing delays: threshold ≥ 3/2 median value Decoder Waveforms after RF-phase reversing delays: threshold ≥ 3/2 median value Decoder Waveforms after RF-phase reversing delays: threshold ≈ 3/2 median value

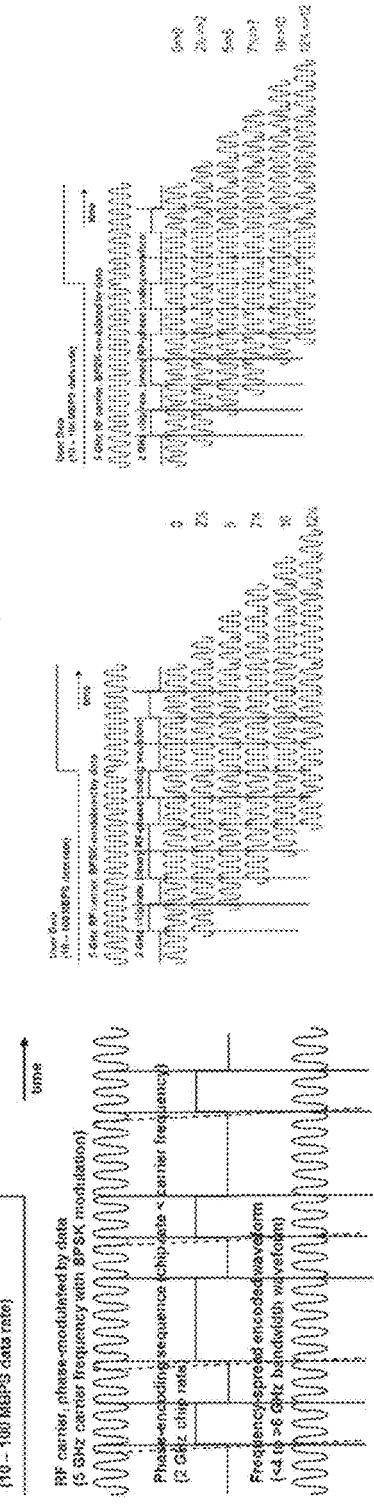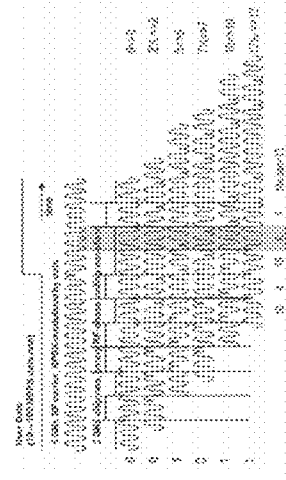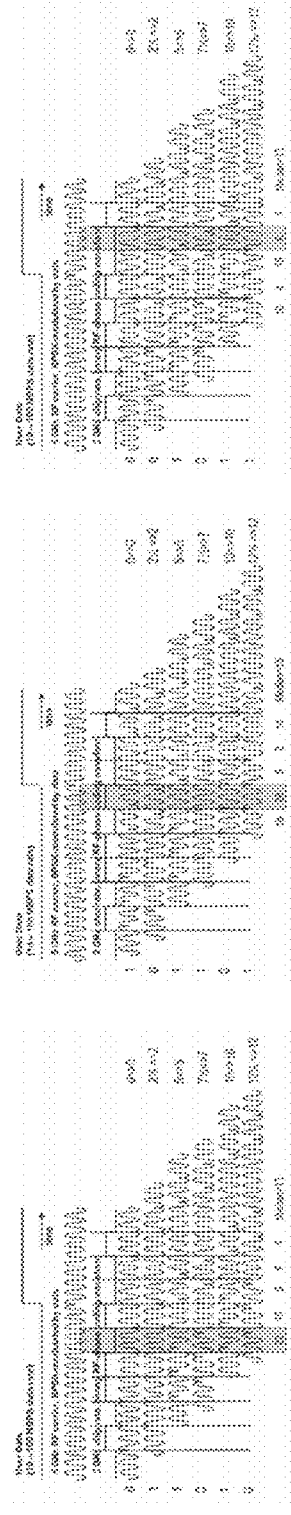
FIG. 15A FIG. 15B FIG. 15C
FIG. 15D FIG. 15E FIG. 15F

JAMMER-SUPPRESSED PHOTONIC-ENABLED RF LINK

STATEMENT REGARDING FEDERAL FUNDING

This invention was made under U.S. Government contract N66001-16-C-4031. The U.S. Government has certain rights in this invention.

CROSS REFERENCE TO RELATED APPLICATIONS

None.

TECHNICAL FIELD

This disclosure relates to radio frequency (RF) links, and in particular to suppression of interference.

BACKGROUND

Radio frequency (RF) links between a link transmitter and a link receiver may be limited in their operation due to interference received by the link receiver. This is especially true if the link receiver is located near a high power transmitter such as for RADAR.

U.S. Pat. No. 7,053,814, issued May 30, 2006, which is incorporated herein by reference, describes a photonic time-delay encoder for spreading the bandwidth of a RADAR waveform and a corresponding photonic time-delay decoder for dispreading and narrowing the bandwidth of the encoded waveform. The encoding is accomplished by a photonic encoder circuit, shown in FIG. 1A of U.S. Pat. No. 7,053,814, that selects optical delay lines for applying an equivalent pattern of RF phase shifts, with the time-pattern of phase shifts implementing a phase code. The decoding is accomplished by a photonic decoder circuit, shown in FIG. 1B of U.S. Pat. No. 7,053,814, that produces appropriately delayed taps or delayed copies of the received waveform and then applies an inverse pattern of phase shifts upon those taps. The multiple taps are then combined and directed to a photodetector. The relative delay between successive taps equals the time interval of a phase-code chip.

U.S. Pat. Nos. 7,088,886 and 7,167,614, which are incorporated herein by reference, describe an optical limiter based on seeded stimulated Brillouin scattering (SBS). This optical limiter also is described by D. Yap and W. W. Ng, in "Self-adapting limiter," Digest 2004 International Topical Meeting on Microwave Photonics (MWP'04), pp. 193-195, IEEE (2004), which is incorporated by reference. This limiter comprises a photonic link including a laser, modulator and photodetector for which both a RF signal and a RF interferer are modulated onto the laser light, which is the optical carrier. The limiter also includes a primary SBS medium and a SBS seed generator. The optical spectrum of the light coupled to the primary SBS medium includes energy at the optical carrier and at modulation sidebands associated with the RF signal and with the RF interferer. The SBS seed generator produces light at the Stokes frequency associated with only the interferer sidebands. This Stokes seed is injected into the primary SBS medium to effectively reduce the threshold for SBS of the interferer sidebands in that primary SBS medium. However, no Stokes seed is supplied at the frequencies of the optical carrier or the signal sidebands. Thus, the power-level of the interferer sidebands is attenuated by stimulated Brillouin scattering in the seeded primary SBS medium. But the power levels of the signal sidebands and of the optical carrier are not attenuated.

The SBS seed generator includes a second SBS medium and an optical notch filter. The Stokes seeds for the RF interferer sidebands and for the optical carrier, whose power levels are above the SBS threshold in that second SBS medium, are produced in the SBS seed generator. The power level of the signal sidebands, which are weaker than the interferer sidebands, is below the SBS threshold in the second medium. Thus, no Stokes light is generated for those signal sidebands. The Stokes light for the optical carrier is removed by the notch filter. As a result, only the Stokes light associated with the interferer sidebands is injected into the primary SBS medium. B. J. Eggleton, C. G. Poulton and R. Pant in "Inducing and harnessing stimulated Brillouin scattering in photonic integrated circuits," Advances in Optics and Photonics, 5, 536-578 (2013), which is incorporated by reference, also describe stimulated Brillouin scattering (SBS).

What is needed is an RF link to suppress the effects of narrow-bandwidth RF interference coupled to the receiver of the RF link. The embodiments of the present disclosure answer these and other needs.

SUMMARY

In a first embodiment disclosed herein, a radio frequency (RF) link comprises a link transmitter comprising a data modulator for modulating a data waveform together with an RF carrier, a photonic encoder coupled to the data modulator, and a transmitter antenna for transmitting an RF signal, wherein the RF signal comprises an output of the photonic encoder, and a link receiver comprising a receiver antenna for receiving the RF signal, a first laser source, a photonic limiter coupled to the first laser source and to the receiving antenna, a photonic decoder coupled to the photonic limiter, a photo-receiver coupled to the photonic decoder, and a demodulator coupled to the photo-receiver for demodulating an output of the photo-receiver with the RF carrier to form a data output.

In another embodiment disclosed herein, a receiver for an RF link that receives an RF signal and an interferer, the receiver comprising an optical modulator, a photonic limiter coupled to the optical modulator, and a photonic decoder coupled to the photonic limiter, wherein the optical modulator modulates an optical carrier with the RF signal and with the interferer and produces modulation sidebands associated with the RF signal and modulation sidebands associated with the interferer, and wherein the photonic limiter attenuates modulation sidebands associated with the interferer by a greater amount than the photonic limiter attenuates the modulation sidebands associated with the RF signal.

In yet another embodiment disclosed herein, a method for conducting data between two locations comprises selecting an RF carrier and modulating a phase of the RF carrier according to the data to produce an RF signal having a first bandwidth, selecting a first optical carrier and modulating the intensity, amplitude or phase of the first optical carrier according to the RF signal, applying a first temporal pattern of optical delays to the RF-signal modulated first optical carrier wherein the optical delays have a maximum rate of change that is higher than the first bandwidth, selecting a second optical carrier and modulating the intensity, amplitude or phase of the second optical carrier according to a combination of the RF signal and the first temporal pattern of optical delays thereby producing first modulating sidebands of the second optical carrier, and applying a second temporal pattern of optical delays to the second optical carrier, wherein the second pattern of optical delays produce net RF phase shifts that cancel net RF phase shifts produced by the first temporal pattern of optical delays.

In another embodiment disclosed herein, a receiver for an RF link that receives an RF signal and an interferer, the receiver comprising a plurality of lasers, each laser having a different wavelength of laser light, an optical modulator coupled to the plurality of lasers, a first optical wavelength multiplexer(WMX) coupled to the plurality of lasers, wherein the optical modulator modulates an output of the first optical WMX with the RF signal and with the interferer and produces for each laser wavelength modulation sidebands associated with the RF signal and modulation sidebands associated with the interferer, a photonic limiter coupled to the optical modulator, wherein for each wavelength of laser light the photonic limiter attenuates modulation sidebands associated with the interferer by a greater amount than the photonic limiter attenuates the modulation sidebands associated with the RF signal, and a photoreceiver coupled to the photonic limiter These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIGS. 13A, 13B, 13C, 13D, 13E, 13F, 13G, 13H, 14A, 14B, 14C, 14D, 15A, 15B, 15C, 15D, 15E, and 15F show example waveforms of a photonic enabled RF link in accordance with the present disclosure.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1A:
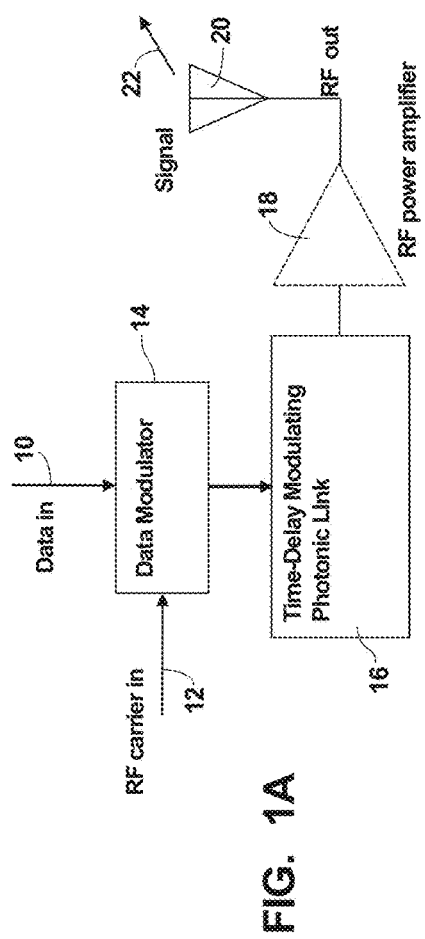
FIGS. 1A and 1B show an interference suppressing RF link in accordance with the present disclosure.
Figure 1B:
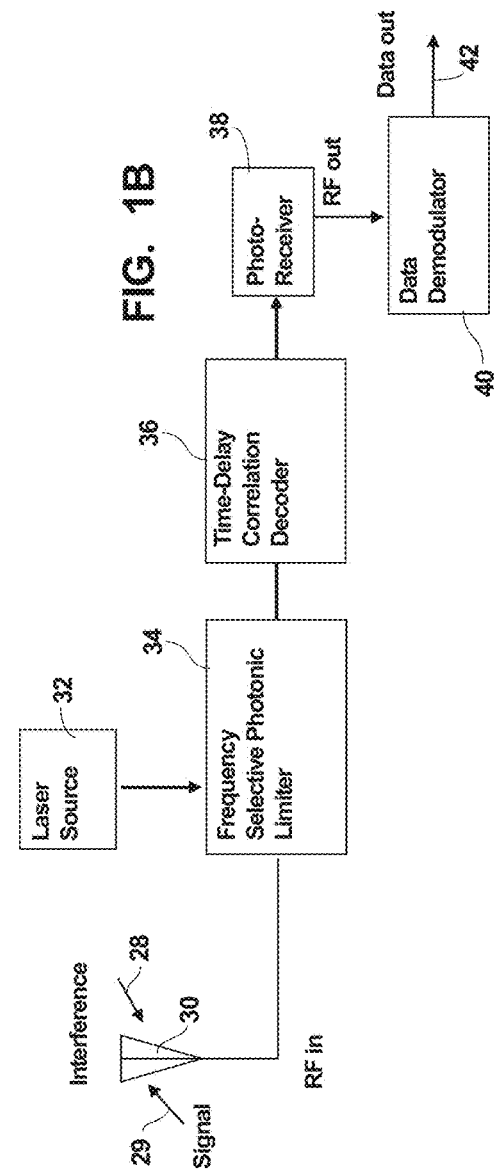

The present disclosure describes a jammer-suppressed photonic-enabled RF link that makes use of photonic time-delay encoding 16 of RF phase in the RF transmitter, as shown in FIG. 1A, and a combination of photonic time-delay decoding 36 as well as photonic limiting 34 in the RF receiver, as shown in FIG. 1B, to suppress the effects of narrow-bandwidth RF interference coupled to the receiver. The photonic encoder 16 applies optical time delays to implement a wideband phase-shift code pattern to a RF signal having a data waveform 10 of narrower bandwidth modulated on an RF carrier 12. The photonic decoder 36 applies optical time delays to implement a pattern of inverse phase shifts to decode the RF signal/carrier waveform. The photonic limiter 34 uses seeded stimulated Brillouin scattering (SBS) of only the optical-modulation sidebands from one or more strong RF interference tones to selectively attenuate those tones while minimally attenuating both the optical carrier and the optical-modulation sidebands from the wideband encoded RF signal.

The photonic encoding at the RF transmitter spreads the signal energy over a large bandwidth. As a result, the level of the optical modulation sidebands associated with that frequency-spread signal can be well below the threshold level for the SBS that occurs in the photonic limiter of the RF receiver. The interference has not undergone this deliberate frequency-spread encoding and thus its energy is concentrated over a narrow bandwidth. The level of the optical modulation sidebands associated with the interference can be well above the threshold for the SBS that occurs in the photonic limiter 34 and thus those modulation sidebands are attenuated as a result of the SBS. The photonic decoding 36 at the RF receiver spreads the energy of the attenuated interference sidebands over a large bandwidth, by phase modulating that interference, and thereby reduces the level of the interference. However, the photonic decoder 36, which applies inverse phase shifts to the encoded sidebands, compresses that sideband energy into a narrower bandwidth. The photo-receiver in the photonic decoder 36 has a limited bandwidth that passes the bandwidth narrowed decoded signal but that filters away much of the enlarged bandwidth interference. The result is a substantial improvement in the ratio of signal power to interference power at the data out 42.

The combination of the photonic limiter 34, the enlarged instantaneous bandwidth resulting from the RF-phase encoding 16 at the transmitter, the decoding 36 at the receiver and the bandwidth-reduced filtering by the photo-receiver 38 enables the RF link of the present disclosure to have enhanced tolerance to strong, narrow-bandwidth interference 28 that may be introduced into the link between the RF transmitter antenna 20 and the receiving antenna 30. A link in accordance with the present disclosure can mitigate a large degree of interference 28, which makes it possible for a RF data link to be located close to a strong RF transmitter, such as a RADAR transmitter. Such photoic frequency-spread encoding also reduces the visibility of the encoded RF signal 22 transmitted by antenna 20, since the transmitted signal power level per unit frequency bandwidth can be reduced. In fact, the power spectral density of the signal 29 collected by the receiver antenna 30 can be well below the power spectral density of the interference 28 collected by that receiver antenna 30 at the frequencies of the interference 28.

FIGS. 1A and 1B show a block diagram of an interference suppressing RF link that has an RF transmitter, shown in FIG. 1A, coupled wirelessly to an RF receiver, shown in FIG. 1B. At the RF transmitter as shown in FIG. 1A, the data 10, which is to be transmitted through the link, is modulated onto an RF carrier 12 by data modulator 14. A modulating format such as phase shift keying may be used by data modulator 14. The data-modulated RF carrier, which is the RF signal, is coupled to a time-delay modulating photonic link 16, which imposes a phase-code modulation onto the RF signal, thereby encoding that RF signal. At each code-chip interval of the phase code modulation, which is much smaller than the interval between successive bits of the data, the time-delay of the signal is shifted by a fixed amount according to a pseudorandom pattern by the time-delay modulating photonic link 16. For an exemplary binary phase code, the possible time-delay values are equivalent to a relative RF phase shift of either 0-degrees or 180-degrees of the RF carrier.

As a first example, it is assumed that the RF carrier 12 has a frequency of 4 GHz with a period of 0.25 nsec or 250 psec, the data 10 has a bandwidth of 10 MHz, and the phase code has a chip rate of 2 GHz. Thus, for each 500 psec chip interval, the RF signal 22 can have an additionally imposed time-delay of 0 or 125 psec according to whether the code has a value of 0 or 1, respectively. The encoded RF signal typically is amplified by RF power amplifier 18, and then is transmitted via an antenna 20, as shown in the FIG. 1A.

The transmitted encoded RF signal 22 is received wirelessly at the antenna 30 of the receiver, shown in FIG. 1B, of the RF link. However, one or more narrowband interferers 28, which can be considered as jammers, can also be coupled to the antenna 30 at the RF receiver. The received jammer power can be much higher than the received power of the encoded RF signal 29 at the frequencies of the jammer. A jammer of sufficiently high power could saturate a conventional RF receiver and degrade the fidelity of the RF signal output from that receiver. The RF receiver shown in FIG. 1B provides a way to mitigate the undesirable effect of the interferers 28, when the RF receiver is used in combination with the RF transmitter of FIG. 1A.

The RF receiver shown in FIG. 1B has a laser source 32, a frequency-selective photonic limiter 34, a time-delay correlation decoder 36, a photo receiver 38, and a data demodulator 40 for demodulating the data-modulation put on the RF carrier 12 by data modulator 14. The time-delay correlation decoder 36 reverses the phase code modulation applied at the RF transmitter and presents a reconstituted RF signal at the output of the photo-receiver 38. The photo-receiver 38 may include a photo-detector and an amplifier. The photonic limiter 34 selectively attenuates the interferers without also attenuating the encoded RF signal. This photonic limiter 34 is able to provide that attenuation without requiring prior knowledge of the frequencies of the interferers 28. Thus, the presently disclosed RF link provides interferer 28 suppression without needing to know beforehand the frequencies of the interferer 28 and can therefore suppress many interferers 28 simultaneously.

The RF link of the present disclosure has an advantage over prior RF links that make use of filters to attenuate the interferers. Each of those filters may be tunable and thus can have its attenuation frequency band tuned to match the frequency of an interferer; however, the frequencies of the interferers must be known or discovered by the RF receiver in order to set the attenuation bands of the filters. And, there typically would be practical limits on the number of such filters.

Figure 2:
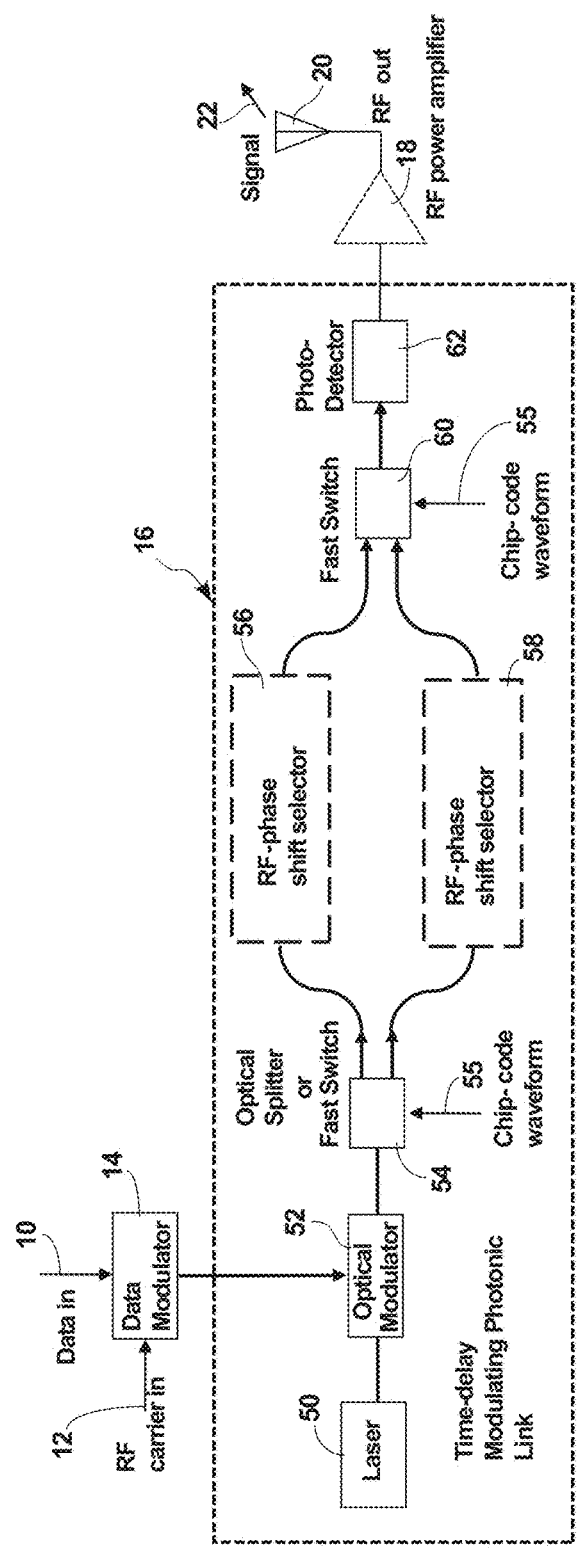
FIG. 2 shows a RF transmitter of a RF link in accordance with the present disclosure.

FIG. 2 provides a detailed illustration of the RF transmitter, and particularly of the photonic link 16 in the transmitter. The data-modulated RF carrier from the data modulator 14 is coupled to the photonic modulator 52, which modulates the light from laser 50 and produces, at the output of photonic or optical modulator 52, an RF modulated optical waveform. That optical waveform is then coupled to an optically switched optical circuit having an optical splitter or fast switch 54, an RF phase shift selector 56, an RF phase shift selector 58, a fast switch 60, and a photo detector 62. The optically switched optical circuit imposes a pattern of time delays to the RF modulated optical waveform. The fast switches 54 and 56 operate at the code-chip rate of the chip-code waveform 55 and have a switch-transition time that is much shorter than a code-chip interval. The RF phase-shift selectors 56 and 58 impose desired time delays. Thus, the pair of fast switches select between one of two possible time delay paths. These time delays can correspond to a selected relative phase shift of the RF carrier. By alternating between two time-delay paths, the amount of time allowed for setting up the time-delay path for a particular RF phase shift selector can be increased. In fact, the set-up time can be almost as long as one chip interval. While the light is directed through a first time-delay path, the second time-delay path can be set up. Then during the next chip interval, the light can be directed through the second time-delay path while the first time-delay path is set again to establish another time delay presumably for the next chip interval.

Figure 3:
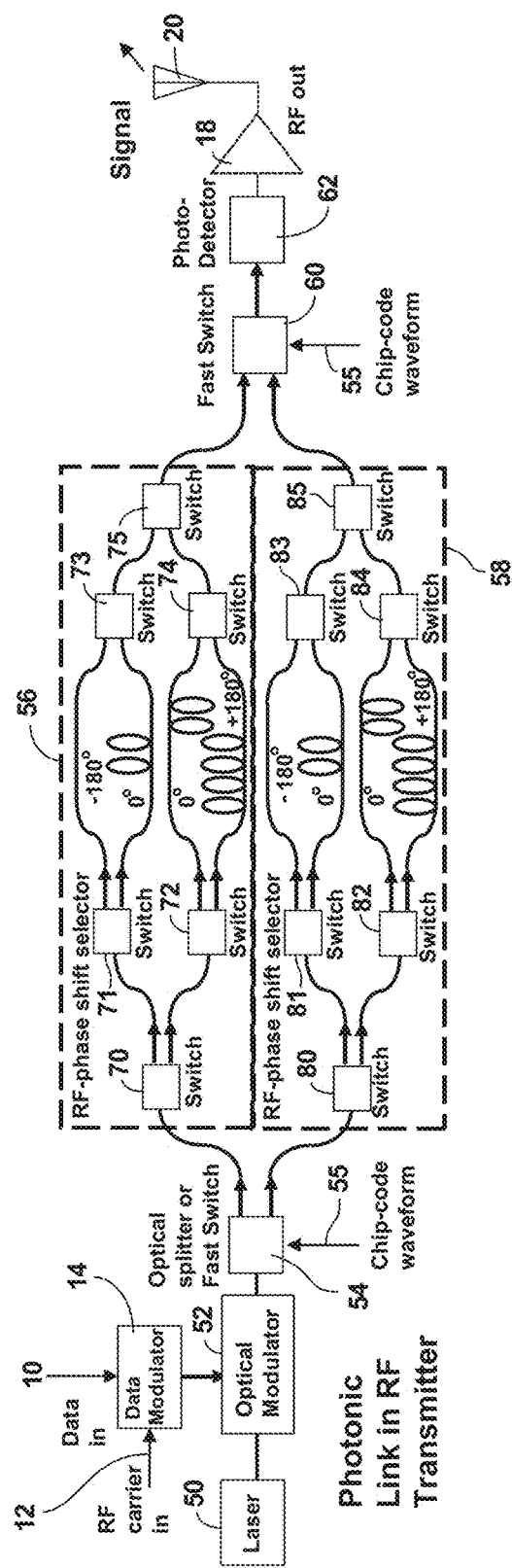
FIG. 3 shows detail of a RF transmitter in accordance with the present disclosure.

FIG. 3 illustrates RF-phase shift selectors that achieve a 2-level or binary phase code with 2 possible phase-shift states. As an example, such phase-shift states may be 0-degrees and +180-degrees or −180-degrees and 0-degrees, as shown in FIG. 3. Assuming the frequency of the RF carrier is 4 GHz (250 psec period), the associated net time delays are 0, and 125 psec. For each RF-phase shift selector 56 and 58, a set of slower optical switches 70, 71, 72, 73, 74 and 75, and 80, 81, 82, 83, 84 and 85, respectively, can be used to select between one of four possible paths that implement these relative time delays.

If the code-chip occurs near the boundary between two successive data bits, the long time-delay used to implement a 180-degree phase shift could essentially move that chip into an adjacent data bit. Since both the data modulation and the code modulation involve phase shifts, moving a chip into an adjacent data bit could result in an error in the phase produced. To keep this error from occurring, the RF-phase shift selector of FIG. 3 can produce both a relative time-delay (+180°) and a relative time-advancement (−180°).

Considering the exemplary case, the time delay for producing a relative phase shift of 180-degrees of the RF carrier is 125 psec. This relative time-delay value is one-fourth the value of a code-chip interval (500 psec). The choice between selecting a +180° or −180° delay path is made considering the need to ensure that the selected delay state is in the same data bit as the specific code-chip interval whose phase is being modulated. For the present example, the data bandwidth is only 10 MHz and the data-bit interval is 100 nsec. Although the data-bit interval is long compared to the phase-shift time delay (0.125 nsec) and the chip interval (0.5 nsec), it still is beneficial to compensate for the occurrence of a data-bit transition unless the data-bit transitions are synchronized with the chip transitions.

The RF transmitter produces an encoded RF signal 22 whose instantaneous bandwidth is much wider than the bandwidth of the data 10. In the example discussed above, the bandwidth of the data 10 is 10 MHz and the bandwidth of the binary phase-shift encoded RF signal 22 is at least 2 GHz. Assuming RF carrier 12 Thus the encoded RF signal 22 has a frequency of 4 GHz, the encoded RF signal 22 spans from at least 3 GHz to 5 GHz, centered at 4 GHz. The bandwidth of the encoded RF signal 22 is increased by using switches 54 and 60 that can switch more rapidly. It is noted that with photonic time-delay encoding 16, it is possible for the chip rate of the code waveform 55 to be chosen so that the bandwidth of the encoded RF signal 22 is equal to or even greater than the frequency of the RF carrier 12. In some cases for which the chip rate is equal to or one-half the RF carrier 12 frequency, it may be beneficial to replace fast switch 54 with an optical splitter or possibly fast switch 60 with an optical combiner.

In a second example, the RF carrier 12, onto which the 10 MHz data is modulated, has a period of 250 psec and the code-chip interval of the chip-code waveform 55 also is 250 psec, corresponding to a code-chip rate of 4 GHz. For this example, the code-chip interval is equal to the period of the RF carrier. In this example it is assumed that the data is used to produce a 0-degree or a 180-degree relative phase shift depending on whether the data value is a logical 0 or a logical 1, respectively. Also this example assumes the phase modulation or phase shift keying of the RF carrier 12 according to the data is done in the electronic domain. This RF signal is then modulated onto the optical carrier, supplied from the laser 50. The intensity-modulated optical carrier is then modulated according to the phase code. A suitable device for applying this phase-code modulation is illustrated in FIG. 3. Each RF-phase shift selector can produce time delays corresponding to relative phase shifts of either −180-degrees, 0-degrees or +180-degrees, to implement binary phase codes, as shown in FIG. 3. For the examples discussed above, a 180-degree phase shift corresponds to a relative time delay of 125 psec, which is still shorter than a code-chip interval, 250 or 500 psec.

Figure 4:
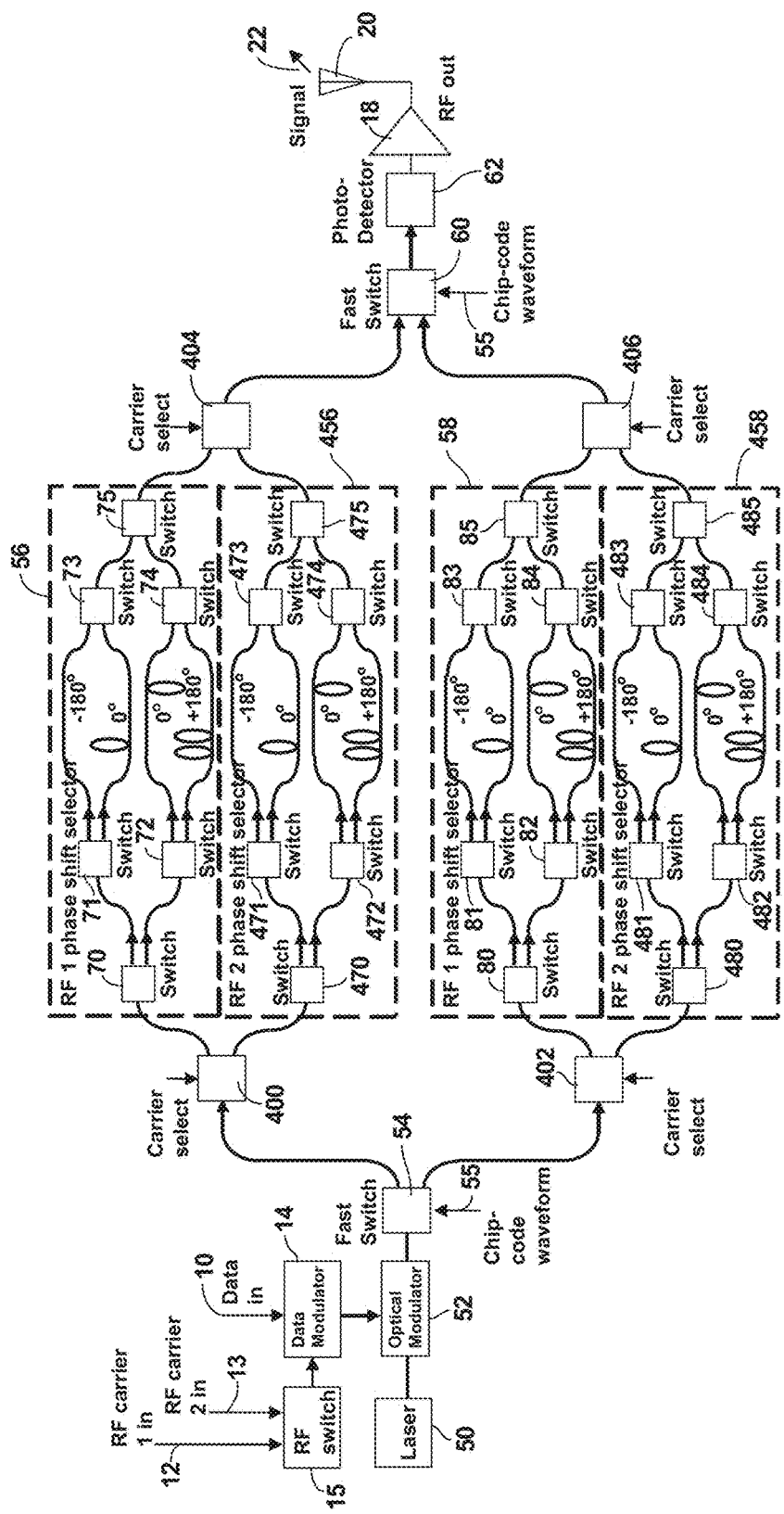
FIG. 4 shows detail of another RF transmitter in accordance with the present disclosure.

In another embodiment, the frequency of the RF carrier could be switched between two different values, RF carrier 12 and RF carrier 13, as shown in FIG. 4. In that case, the RF phase shift selectors have delay paths that provide relative phase shift states of 0° and 180° for each of those two carriers. As the frequency of the RF carrier is changed from RF carrier 12 to RF carrier 13, the selected delay paths are changed to provide the corresponding relative phase shifts for the selected RF carrier frequency. This is accomplished by switching the carrier select switches 400, 402, 404, and 406. RF 1 phase shift selectors 56 and 58, shown in FIG. 4, are used for phase shifting RF carrier 12, in the same manner as described for FIG. 3. RF 2 phase shift selectors 456 and 458, shown in FIG. 4, are used for phase shifting RF carrier 13. The selected delay paths in RF 1 phase shift selectors 56 and 58 provide the corresponding relative phase shifts for the RF carrier frequency 12. The selected delay paths in RF 2 phase shift selectors 456 and 458 provide the corresponding relative phase shifts for the RF carrier frequency 13.

For example, assuming the RF carrier 12 is a 5 GHz frequency RF carrier, the relative time delay difference selected by switches 70, 71, 72, 73, 74 and 75 is 100 psec, and assuming the RF carrier 13 is a 4 GHz frequency RF carrier, the relative time delay difference selected by switches 470, 471, 472, 473, 474 and 475 is 125 psec.

The instantaneous bandwidth of the encoded RF signal 22 likely is much wider than the instantaneous bandwidth of any high-power interferer 28 or jammer whose energy might be coupled into the antenna 30 of the RF receiver. The interferer 28, of course, has not undergone the encoding described above. In general, the bandwidth of the interferer 28 is no greater than 10 MHz and may be much smaller than 1 MHz. The photonic limiter 34 makes use of this narrow-bandwidth property of the interferer 28.

Figure 5:
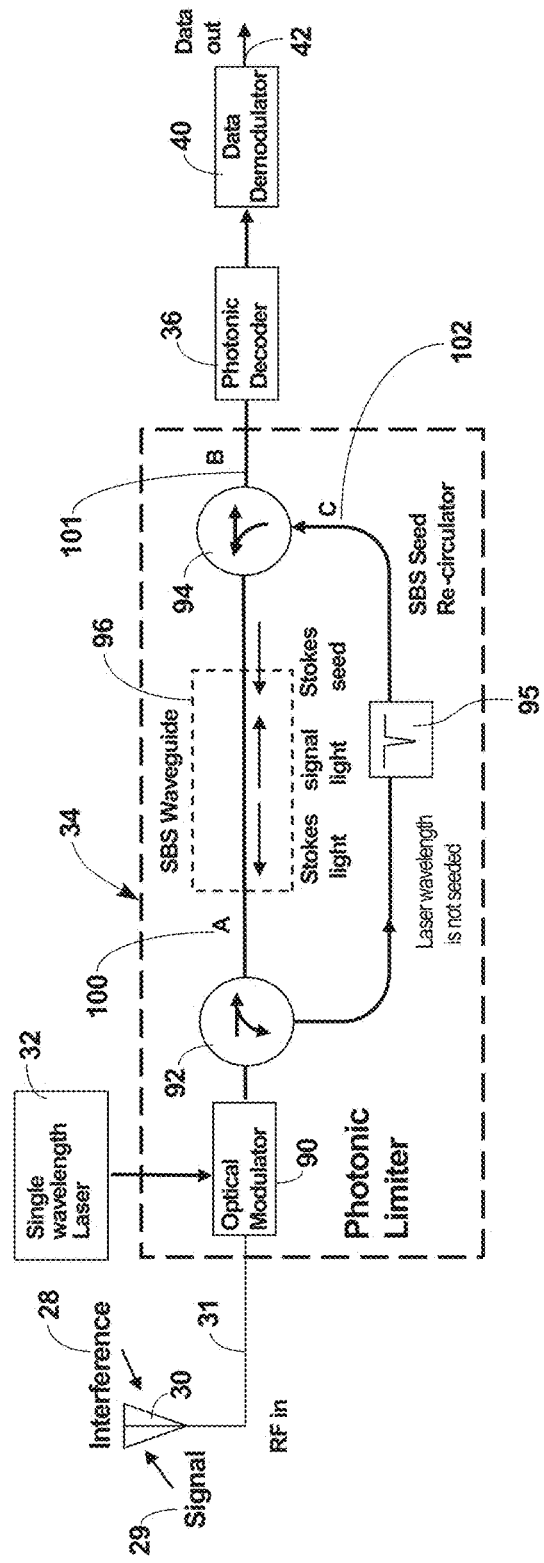
FIG. 5 shows detail of a photonic limiter in a RF receiver in accordance with the present disclosure.

FIG. 5 shows one embodiment of the photonic limiter 34. In this embodiment, the RF receiver contains a photonic link that includes a laser source 32, which may be a single wavelength laser, an optical modulator 90, a segment of optical waveguide 96 in which stimulated Brillouin scattering (SBS) can occur, a photonic decoder 36 and a data demodulator 40. The received RF waveform 31 is coupled to the optical modulator 90 and produces, at the output of the modulator, an optical waveform whose spectrum contains components associated with the laser 32 frequency—the optical carrier, the frequencies of the interferers 28, and the frequency spread encoded RF signal 29. A pair of optical couplers 92 and 94, which may be optical circulators, extracts and then injects the frequency-shifted Stokes light of all strong interferer 28 components back into the SBS waveguide 96, to reduce the SBS threshold for those components. An optical filter 95 placed in the feedback or re-circulation loop keeps the Stokes light associated with the optical carrier from being re-injected into the SBS waveguide. The photonic decoder 36 feeds the data demodulator 40, which produces data out 42.

Figure 6A:
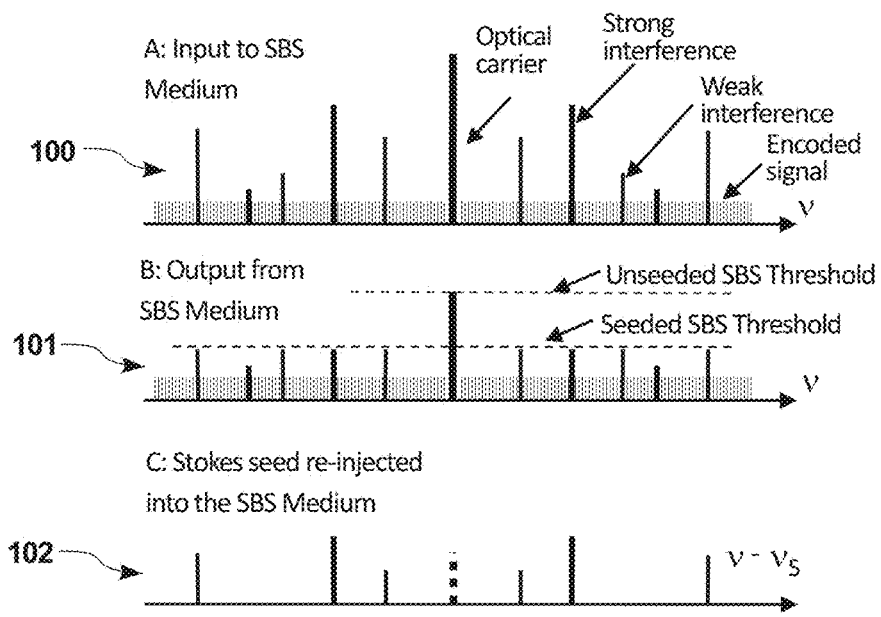
FIGS. 6A and 6B show optical spectra observed at various points in the photonic limiter in accordance with the present disclosure.
Figure 6B:
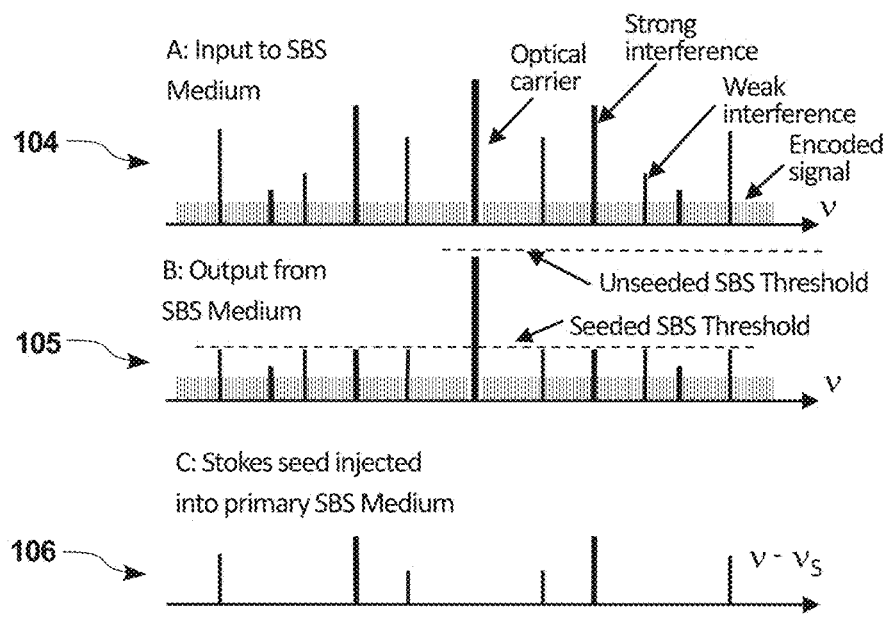

FIGS. 6A and 6B show the optical spectrum of the waveforms at various points in the photonic limiter 34. In general, the tone associated with the laser 32 carrier is dominant. For a typical optical modulator 90, both upper and lower modulation sidebands are produced. As illustrated, the tones associated with the narrowband interferers 28 can be much stronger than the tones associated with the frequency spread encoded signal 29. For example, given a code-chip rate of 2 GHz (or code-chip interval of 500 psec), the overall spectral coverage of the encoded signal is at least 2 GHz. It is assumed, as an example, that the pseudo-random (PR) code pattern has a finite temporal extent of 1 psec and then the code repeats. Thus, the optical modulation-sideband spectrum associated with the encoded signal contains a series of spectral lines with a spacing of 1 MHz. Incidentally, in cases for which the length of the PR code pattern is finite, the overall code can include a concatenation of multiple PR code segments. However, these code segments can be selected to have different lengths, and thus the repetition of the code pattern segments need not be periodic. In fact, that repetition process and also the code-segment lengths can be pseudorandom. For example, each segment could start with a different pseudo-randomly chosen code-chip of the same code pattern. In general, it is preferable to have the pseudo-random code pattern be substantially longer than the duration of a data bit. Also, the length of a repeating code pattern is preferably not a multiple of a data bit interval.

FIG. 6A shows the optical spectrum observed at various points in the schematic of FIG. 5. The spectrum observed at point 100 is at the input to the SBS medium. The spectrum observed at point 101, the output from the SBS medium, shows that the tones associated with the strong interferers are attenuated to a level approximately equal to the SBS threshold of the SBS medium. The tones associated with weak interferers 28, whose power level is below the SBS threshold, are not attenuated. Stimulated Brillouin scattering (SBS) essentially transfers power from a forward propagating wave into a backward propagating or reflected wave (the Stokes light) whose frequency is shifted by an amount characteristic of the SBS medium. The frequency shift is on the order of 10-20 GHz.

SBS is discussed in detail in the article by B. J. Eggleton, C. G. Poulton and R. Pant, in "Inducing and harnessing stimulated Brillouin scattering in photonic integrated circuits," Advances in Optics and Photonics, 5, 536-578 (2013), which is incorporated herein by reference.

As illustrated in the FIG. 5, some of the power in the optical carrier also is converted into Stokes light since the optical carrier generally is more intense or is stronger than the various modulation sidebands. The optical filter 95 in the feedback path prevents the Stokes light associated with the optical carrier from being re-injected into the SBS waveguide 96 from the opposite end of that SBS waveguide 96. FIG. 6A also illustrates the spectrum of the Stokes seed light re-injected into the SBS waveguide through point 102, as depicted in FIG. 5. The feedback or re-injection of the Stokes light associated with the strong interferers causes the SBS of those particular interferer components to be enhanced by this seeding of the Stokes light. However, the SBS of the optical carrier is not enhanced. As a result, the strong interferers, observed at point 101, undergo a much greater attenuation than the optical carrier.

The spectrum observed at point 101, the output from the photonic limiter, shows that the sidebands associated with the strong interferers are attenuated to a level approximately equal to the seeded SBS threshold. The optical carrier is attenuated somewhat, since it does undergo some SBS. The sidebands associated with the weak interferers and with the encoded signal are not attenuated.

In some cases, it is desirable to avoid attenuating the optical carrier from laser 32. One way to accomplish this is to use the configuration depicted in FIG. 7. This embodiment of a photonic limiter 34 contains two SBS media or waveguides. The primary SBS waveguide 126 has a much higher SBS threshold power level than does the secondary SBS waveguide 122. One way to reduce the SBS threshold power is by using a longer SBS waveguide. Other ways include reducing the propagation loss of the SBS medium, forming a Brillouin laser containing the SBS medium, concentrating the waveguided light in the SBS medium into a smaller area, and constructing the SBS medium from material that have a larger Brillouin gain factor. Ways such as these are discussed in the article by B. J. Eggleton, C. G. Poulton and R. Pant, in "Inducing and harnessing stimulated Brillouin scattering in photonic integrated circuits," Advances in Optics and Photonics, 5, 536-578 (2013), which is incorporated herein by reference.

Figure 7:
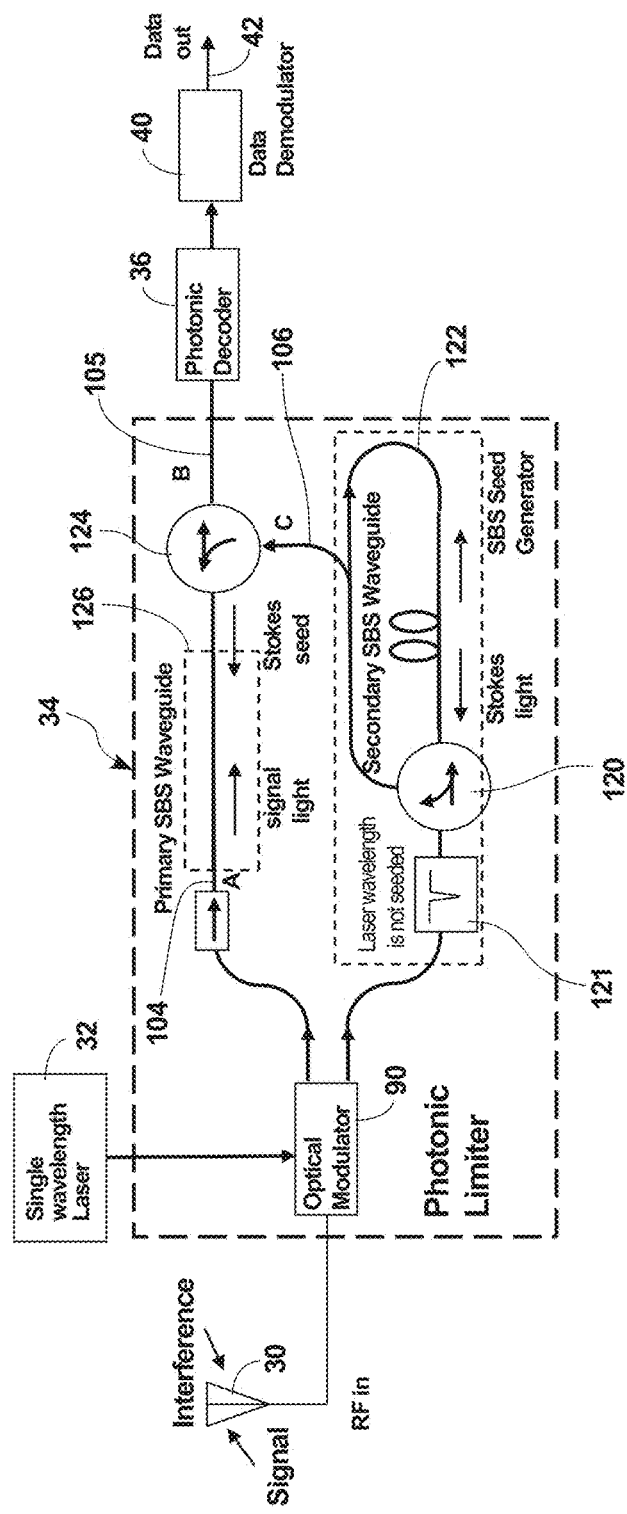
FIG. 7 shows detail of another photonic limiter in a RF receiver in accordance with the present disclosure.

In the embodiment of FIG. 7, the SBS threshold of the unseeded primary SBS waveguide 126 is preferably higher than the intensity of the optical carrier from the laser 32 coupled into the waveguide 126. Also, the SBS threshold of the secondary SBS waveguide 122 is substantially lower than the intensity of the modulation sidebands associated with the strong interferers 28, whose attenuation is desired. The optical modulator 90 in the embodiment of FIG. 7 has dual outputs, to efficiently make use of the input light from the laser source 32. The light coupled to the secondary SBS waveguide 122 is first filtered by filter 121 to remove the optical carrier and is input to the secondary SBS waveguide 122 by optical coupler 120, which may be an optical circulator. Thus, only the strong interferer sidebands undergo SBS in the secondary SBS waveguide 122. The secondary SBS waveguide 122 is depicted in FIG. 7 as being in a Brillouin laser configuration. The Stokes light (106 shown in FIG. 6B) produced by the secondary SBS waveguide 122 is injected into the primary SBS waveguide 126 by optical coupler or circulator 124 to seed the SBS of the interferer components in the primary SBS waveguide 126.

FIG. 6B shows the spectrum of the Stokes seed coupled into the primary SBS waveguide, as observed at point 106 of the structure depicted in FIG. 7. FIG. 6B also shows the spectrum observed at point 104, the input to the primary SBS waveguide 126, and at point 105, the output from the primary SBS medium in the structure of FIG. 7. As illustrated, the optical carrier from single wavelength laser 32 is not attenuated and only the sidebands associated with the strong interferers are attenuated.

Figure 8:
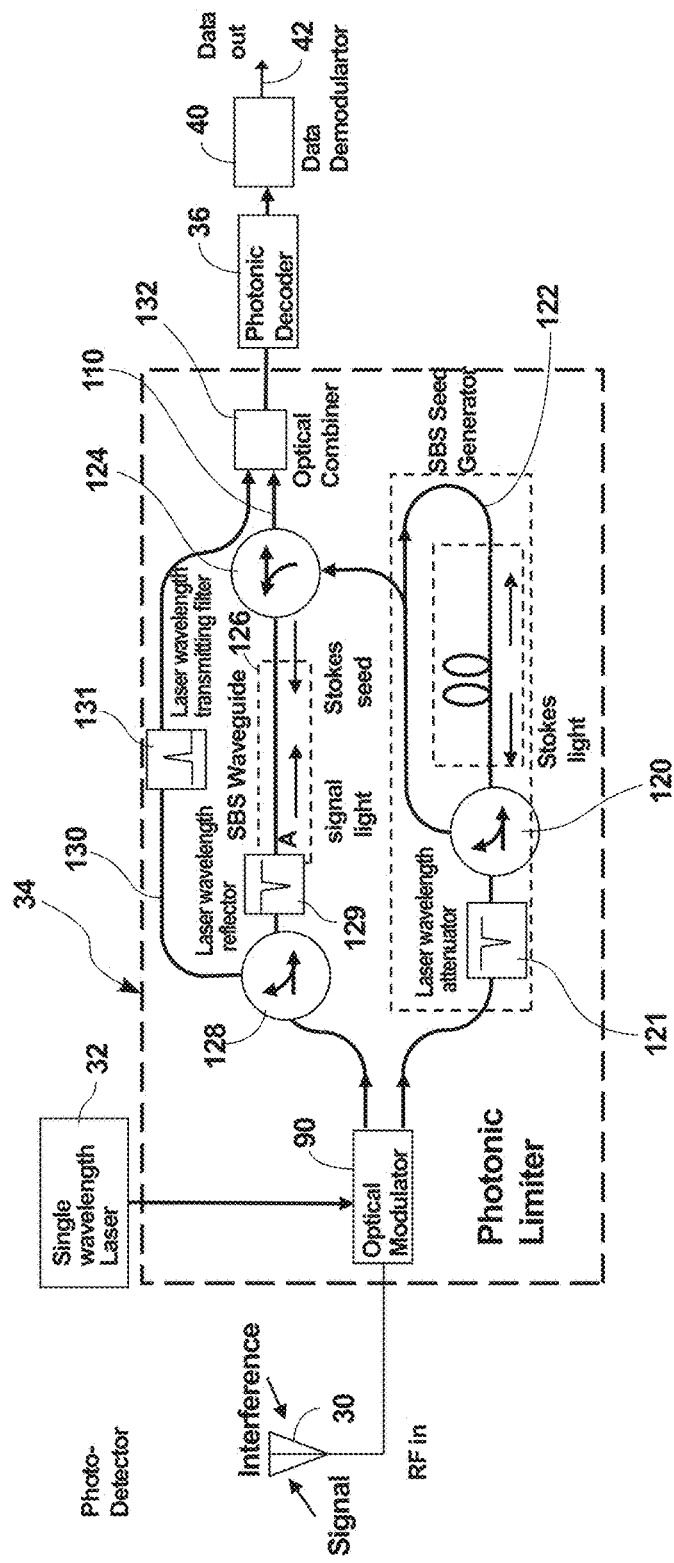
FIG. 8 shows detail of yet another photonic limiter in a RF receiver in accordance with the present disclosure.

FIG. 8 shows yet another embodiment of the photonic limiter 34. In this example, the optical carrier is diverted to bypass the primary SBS medium by adding optical coupler or circulator 128, laser wavelength reflector 129, and laser wavelength transmitting filter 131. Thus, the SBS threshold of the primary SBS medium can be reduced compared to the example of FIG. 7 so that more of the interferer 28 energy, such as from somewhat weaker interferers, can be attenuated. The optical carrier from laser 32 is selectively reflected by component 129, which may be a waveguide Bragg grating and coupled out via optical circulator 128, and is re-combined with the photonically limited sidebands after the output 110 of the primary SBS medium. An optical combiner 132, which may be a high-Q optical-frequency selective add/drop unit 132 combines the optical carrier, output from optical filter 131, with the modulation sidebands that are transmitted through the primary SBS waveguide. One way to obtain such an optical frequency-selective add/drop unit 132 is with a combination of an optical circulator and a grating reflector.

Figure 9:
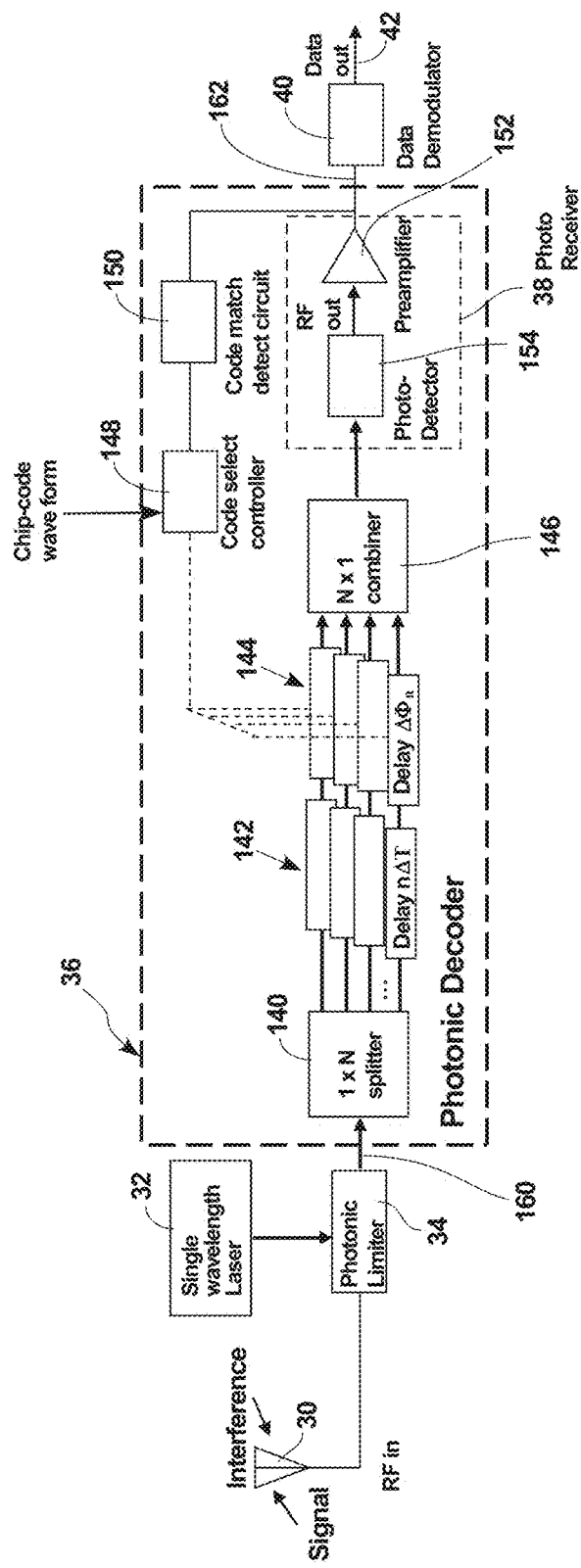
FIG. 9 shows detail of a photonic decoder in a RF receiver in accordance with the present disclosure.

The optical output of the photonic limiter 34 is coupled to the photonic decoder 36. FIG. 9 illustrates an example of a photonic decoder 36. The decoder 36 processes the continuous-time waveform by addressing a group of N successive code-chips at a given instance. The optical waveform 160 from the limiter 34 is split by a 1×N power splitter 140 into N paths. Each path is coupled to an optical delay 142, which is in turn coupled to optical delay 144, as shown in FIG. 9. The optical delays 144 may occur before or after optical delays 142. Each optical delay 142 has a value determined by n×ΔT, where ΔT is the code-chip interval and n is the index of that path; the value for n ranges from 1 to N. Each of the N optical delay values 142 are further adjusted to be a multiple of the RF-carrier period. The time-staggered serial-to-parallel conversion achieved by the 1×N splitter and the delays 142 enable the simultaneous extraction of a subset of N successive code-chips out of a total of M code-chips in the encoded waveform. To be more specific, the path having n=1 views the $m^{th}$ code-chip of the entire waveform, with m having a value that ranges from 1 to M, where M is the length of the code. The Nth path (i.e., having n=N) views the $(m-n+1)^{th}$ code-chip of the entire waveform.

Different paths have different delay 144 values, according to the code-pattern value for its associated code-chip. Each delay 144 has a value that is the inverse of the time-delay code for the $(m-n+1)^{th}$ chip of the code pattern, for a given group of N code-chips. Considering the first exemplary case, if the encoded chip has a relative time delay equivalent to a 180 degree relative phase shift (or 125 psec), the delay 144 value for decoding this chip would have a relative time advancement equivalent to 125 psec. Likewise, if the encoded chip has a relative time delay equivalent to a 0 degree relative phase shift, the delay 144 value for decoding this chip would have a relative time advancement of 0. The delay 144 value for decoding this chip counteracts the relative delay imposed by the transmitter encoder 16. The desired net result of the combination of both an encoding time delay provided by the time-delay modulating photonic link 16 and a decoding time delay provided by delays 142 and 144 is to produce an overall time delay equivalent to a 0 degree (or modulo 360 degree) relative phase shift for all N chips, so that all chips have the same relative time delay.

In any instance of time, N successive chips of the optical waveform can be decoded. When the time-delay pattern imposed by the encoder on these N chips of the input waveform matches the inverse-code time-delay pattern that is imposed by the decoder 36, all N paths ideally produce the same net delay. As a result, the RF modulations of the optical carriers in these N paths are coherent. The light in the N paths are coupled together by an N-to-1 optical combiner 146. The net result output from the combiner 146 is, ideally, an N-times greater modulation of the optical carrier for a group of N code-chip intervals within which the modulations of the optical carrier are coherent, and whose RF phase is thus aligned to be a multiple of a period of the sinusoidal RF-carrier waveform. This enhanced modulation produces, ideally, an N-times larger RF signal at the output of the photodetector 154 of photo-receiver 38.

The first occurrence of this enhanced modulation sets the state of an indicator in the code match detector circuit 150 to indicate that the code pattern in the decoder is now aligned with the code pattern in the encoded signal waveform. For subsequent code-chip intervals, the value of the delay 144 in each of the N paths is updated by the code select controller 148 such that the $(n-1)^{th}$ path is updated with the previous second-delay value for the $n^{th}$ path. Also, the value of the first path (i.e., having n=1) is updated with the second-delay value for the $(m+1)^{th}$ code chip. The values of the delays 144 are not changed until this code-pattern-match indicator becomes set. In some designs, the code-match detect circuit 150 may wait until a match is observed for several successive code-chip intervals before determining that a code pattern match has been achieved.

The delays 144, which are the phase-shifting delays, as shown in FIG. 9, can be implemented using the RF phase-shift selectors and the fast optical switches depicted in FIGS. 2, 3, and 4. Each phase-shifting delay unit can have a "current" delay state (which remains static until a code match is obtained) and a "next" delay state that is being prepared.

Once the reversing code pattern set by the decoder 36 becomes aligned with the code-pattern in the encoded signal waveform, the code pattern of RF-phase reversing time delays set by the decoder 36 can be updated on each successive code-chip interval in order to retain that alignment. As a result, the output from the N×1 combiner 146 will continue to have enhanced RF modulation of the optical carrier and thus the RF signal output from the photo-detector 154 is enhanced. This enhanced RF signal reconstructs the RF carrier and the data modulation of that carrier. The code-pattern aligned decoder 36 reverses the phase coding applied at the RF transmitter.

The code-pattern-matched decoder 36 can enhance the modulation of the optical carrier by the desired RF signal. However, the decoder 36 reduces the net modulation of the optical carrier by the interferers 28. This occurs because the various phase-shifting delays 144 of the decoder 36 apply different phase shifts to the interferers 28 in the N paths, which initially had the same phase shift.

To further elucidate this function of the phase-shifting delays 144, the exemplary cases described above with reference to FIG. 3 may be considered for which the code is a binary phase code having two possible time-delay states of the RF carrier. For a centered pseudo-random pattern, the number of code-chips having 0-degree relative phase shift approximately equals the number of code-chips having 180-degree relative phase shift. For a sufficiently large value of N, the chips with 0-degree relative phase shift would cancel the chips with 180-degree relative phase shift and the net result from combining the N chips would be zero amplitude, ideally.

In a chip interval for which a pattern of N successive decoder-applied inverse phase shifts exactly compensates for a pattern of N successive encoder-applied phase shifts, the amplitude of the RF-signal modulation obtained from combining the N chips is ideally N times greater than the amplitude of the RF-signal modulation in a single chip. The output waveform thus has a series of large modulation-amplitude pulses that have a width of one code-chip interval, that gradually increase and reach a maximal amplitude when the first code match is encountered, and that continue to have a maximal amplitude for subsequent code-chip intervals until the end of the code pattern is reached, after which the modulation-amplitude gradually decreases. Once the code match is no longer sustained and the modulation-amplitude decreases, the code-pattern-match indicator can be reset and the delays 144 can be configured with the inverse of the initial portion for the next code.

Figure 10:
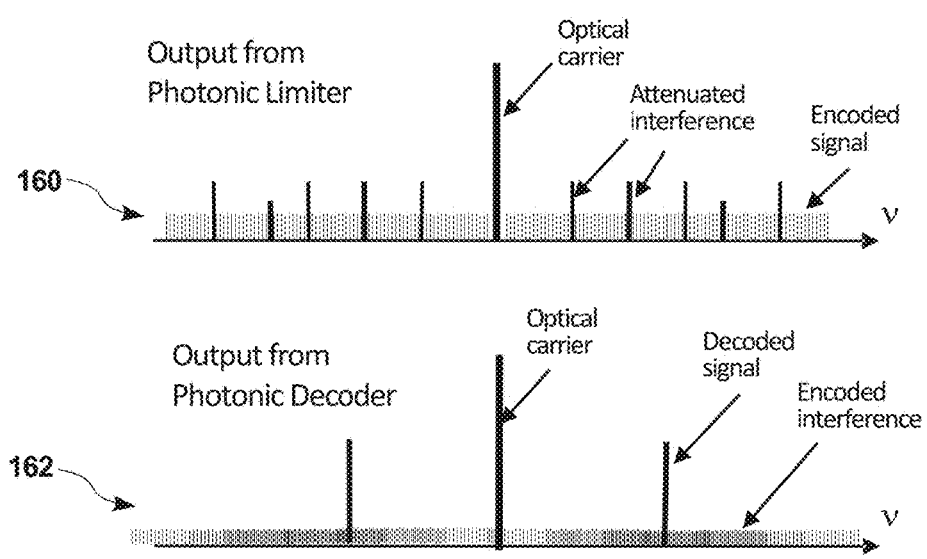
FIG. 10 shows optical spectra observed at various points in the photonic decoder in accordance with the present disclosure.

FIG. 10 illustrates the optical spectra of the waveforms observed at the output 160 of the photonic limiter 34, which is the input to the photonic decoder 36, and at the output 162 of the photonic decoder 36. As depicted in FIG. 10, in the spectrum 160 of the waveform supplied to the decoder 36, the optical-modulation sidebands of the encoded RF signal are relatively weak with low intensity per unit frequency and are widely spread in frequency. In contrast, the modulation sidebands of the interferers 28 have narrow bandwidth and, even after the limiting, can be stronger than the sidebands of the encoded RF signal. The decoder 36 makes N copies of the jammer sidebands and applies pseudo-randomly chosen time delays 144 mimicking RF phase shifts to each of those copies. Consider the examples discussed above in reference to FIG. 3 which involves a binary code. On average, approximately one-half of the copies of the interferer 29 would receive a relative phase shift of 0 degrees and one-half of the copies would receive a relative phase shift of 180 degrees. For example, when the RF-carrier frequency of the signal 29 and the frequencies of the interferers 28 are much higher than the chip rate, the RF-modulation of the photonic waveform is phase-shifted by 0 or 180 degrees but otherwise remains essentially unchanged over the time-interval of one code-chip. As a result, the interferer 28 sidebands for most of the N copies cancel each other. Thus, the intensity per unit frequency of those interferer 28 sidebands is reduced as shown in spectra 162 in FIG. 10. Discussed later with reference to FIGS. 13A, 13B, 13C, 13D, 13E, 13F, 13G, 13H, 14A, 14B, 14C, 14D, 15A, 15B, 15C, 15D, 15E, and 15F are examples for which the RF-carrier frequency is comparable to the chip rate, although the data-bit rate is much lower than the chip rate.

The decoder 36 converts the wide bandwidth chip-encoded modulation of the RF signal (i.e., the data modulated RF carrier) back to the much narrower bandwidth of the data, since much of the chip modulation in the code-matched RF signal is reversed by the decoder. But the decoder 36 applies a wide bandwidth, frequency spreading chip-modulation on the originally narrow-bandwidth interferers 28, which previously did not have any chip modulation. The chip-modulated interferers output from decoder 36 then have a bandwidth of at least the chip rate. In contrast, the decoded RF-signal output from decoder has a bandwidth of approximately the data rate. The data rate is much smaller than the chip rate and can be several orders of magnitude smaller.

The photo-receiver 38 has an optical input and an RF output with a bandpass frequency response. As shown in FIG. 9, the photo-receiver 38 can include a photo-detector 154 and an electronic amplifier 152. The photo-receiver 38 ideally has a frequency response with one or more passbands, each passband being centered at a RF carrier frequency. The bandwidth of a photo-receiver 38 passband should be larger than the data rate. The bandwidth of a photo-receiver 38 passband preferably is much smaller than the chip rate. The photo-detector 154 should have a frequency response bandwidth that is sufficiently larger than the frequency of the RF carrier 12. However, the photo-receiver 38 may have and preferably does have a frequency response bandwidth that is smaller than the chip rate of the chip-code waveform 55 albeit still being larger than the bandwidth of the data 10. The bandpass RF filtering response can be implemented in the electronic amplifier 152, or in a combination of that amplifier 152 and the photo-detector 154. As a result, the photo-receiver 38 can act as an RF filter that removes much of the fluctuations associated with the rapid modulation of the interferers 28 by the set of delays 144, which can have their delay states changed at each successive chip interval. In essence, the photo-receiver 38, whose response bandwidth is preferably not much greater than the data rate (e.g., <0.1 GHz), filters away much of the energy in the frequency spread interferers 28, whose bandwidth is at least as large as the chip rate (e.g., 4 GHz). The RF bandpass filtering provided by the photo-receiver 38 accomplishes some rejection of the interferers 28. The RF-phase reversing delays 144 in combination with the N×1 optical combiner 146 and the chip-staggered delays 142 accomplish additional rejection of the interferers 28.

Figures 13F, 13G, 13H:
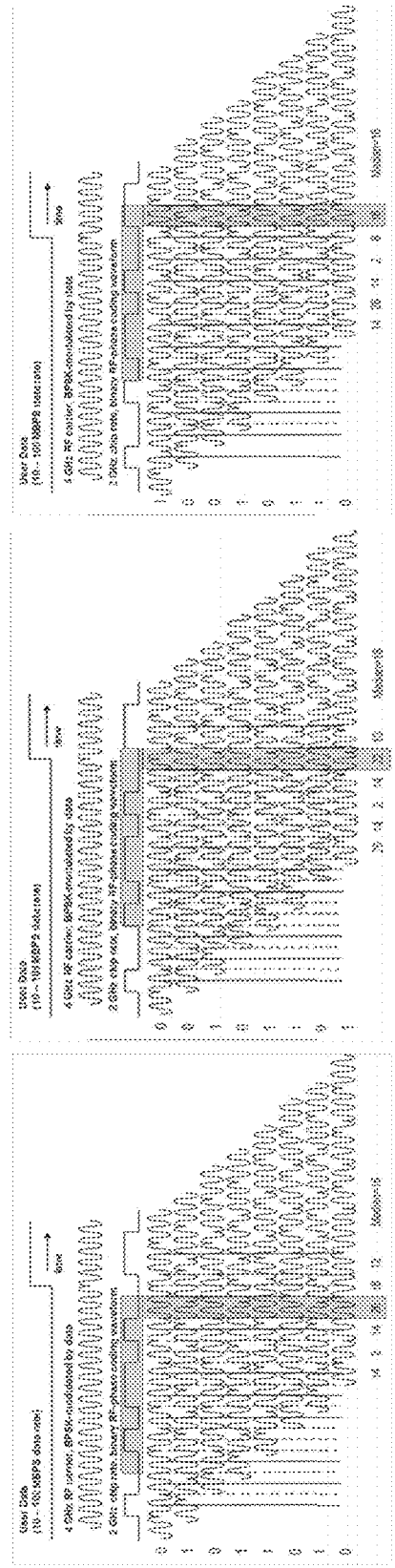

FIGS. 13A, 13B, 13C, 13D, 13E, 13F, 13G, 13H, 14A, 14B, 14C, 14D, 15A, 15B, 15C, 15D, 15E, and 15F provide additional illustrations of the functions of the photonic decoder. Consider the example illustrated in FIGS. 13A to 13H. For this example, the chip interval is equal to two periods of the RF carrier (i.e., chip rate equals one-half the RF carrier frequency). An example of a frequency spread chip-encoded RF waveform is shown in FIG. 13A. The data-modulated RF carrier has a phase reversal when the value of the data changes. The chip-modulation, or encoding, produces additional phase reversals. FIG. 13B illustrates the waveforms in the N channels (N=8 in this example) of the decoder 36 after the splitter 140 and the delay units 142 that apply time-delay increments whose values are multiples of the RF-carrier period as well as the chip interval. These waveforms are copies of the received RF waveform and represent the modulation of the optical carrier supplied by laser 32. Compared to the first copy, the second copy has a relative time delay of 2 periods of the RF carrier. The third copy has a relative time delay of 4 periods, a fourth copy has a relative time delay of 6 periods, etc.

For this example, each chip interval contains 4 half-cycles of the RF carrier. The RF output from the photodetector 154 would be a waveform whose magnitude for each carrier half-cycle depends on the relative phases of the N=8 RF waveforms modulated on the optical carriers at the input to the combiner 146 and depends on whether those waveforms superpose constructively or destructively. The superposition of the N=8 waveform portions for each half cycle of the RF carrier over one chip interval are considered. If two waveforms are 180-degrees out of phase, they superpose destructively, yielding a net score of zero. If two waveforms are in phase, they superpose constructively, yielding a net score of two. The result of this superposition has a median value of 16, for this example. Score values for several different chip intervals are shown at the bottom of FIG. 13B. The scores for these chip intervals (with values between 0 and 4) are all well below the median value. These low scores highlight the pseudo-random variation of the encoded RF-phase from code-chip interval to the next.

FIGS. 13C to 13F illustrate the N waveforms at the output of the phase-reversal delays 144 as considered at a given interval of time as indicated by vertical bar 300, shown for example in FIG. 13C, which has a width of one chip interval. For the chip interval highlighted, the N waveform copies correspond to N successive chips of the chip-code waveform 55. These N code chips within the observation window are highlighted by horizontal bar 302, shown for example in FIG. 13C, over the RF phase coding waveform. The values of the chip code are given at the left of each figure. For example, the chip code for the waveforms of FIG. 13C is 01001011 and the chip code for the waveform of FIG. 13D is 10010110. The chip code for the waveform of FIG. 13E is 00101101 and the chip code for the waveform of FIG. 13F is 01011010. Those waveform channels whose associated chip-code waveform 55 have a value of 0 are given a relative time delay of one-half period of the RF carrier (corresponding to a relative phase shift of 180°) compared to those channels whose associated chip-code waveform 55 have a value of 1. Alternatively, those waveform channels whose associated chip-code waveform 55 have a value of 1 are given a relative time advancement of one-half period of the RF carrier (corresponding to a relative phase shift of −180°) compared to those channels whose associated chip-code waveform 55 have a value of 0. This series of figures illustrate how the portion of the chip code waveform 55 being considered and also the modulation waveforms in the N decoder channels are advanced one chip at a time as the time progresses from one chip interval to another.

The numbers shown at the bottom of FIGS. 13C-13F are scores indicating the number of half-periods of the 8 combined waveforms that overlap coherently or in-phase with each other. This score is representative of the average power (in that chip interval) output from the photo-detector 154 following the N-to-1 combiner 146. The maximum possible score for this example is 32, obtained when all 8 waveforms align perfectly within a chip interval. If the received waveform does not have the proper code or whose code sequence is not aligned or is not synchronized with the chip code waveform 55 of the decoder 36, the value of this score typically would be no larger than 16, the median value. For the examples of FIGS. 13C-13F, the decoded chip intervals have a score of 26 and most of the other nearby chip intervals, for which the N waveforms are not aligned, have a score value between 2 and 14.

FIGS. 13C-13F consider 4 successive chip intervals. For these chip intervals, the decoded and then combined waveforms produce a score of 26. This score value is indicative of the average RF power output from the photodetector 154. The threshold for a comparator in the code-match detect circuit 150 can have a value corresponding to a score value of 24 (which is 75% of the maximum value and is 3/2 the median value) and produce a positive indication of a match for these chip intervals, but this threshold is sufficiently high to produce a negative indication for signal waveforms that are not aligned with the chip code. In some cases, a code match may be determined by observing several successive code-chip intervals (such as the combination of the 4 results illustrated by FIGS. 13C to 13F.

FIGS. 13G to 13H illustrate the effect of a data-bit boundary on the photonic decoding. When the N chip intervals being observed by the decoder straddle a data-bit boundary at which the value of the data changes, the output from the combiner 146 or photodetector 154 can be reduced. This is because some half cycles being superposed are phase-modulated according to one data value and other half cycles are phase-modulated according to a different data value.

Figure 14A:
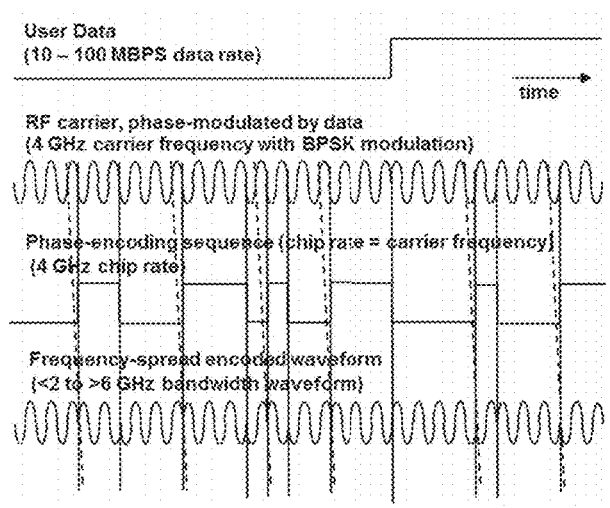
Figures 14B, 14C, 14D:
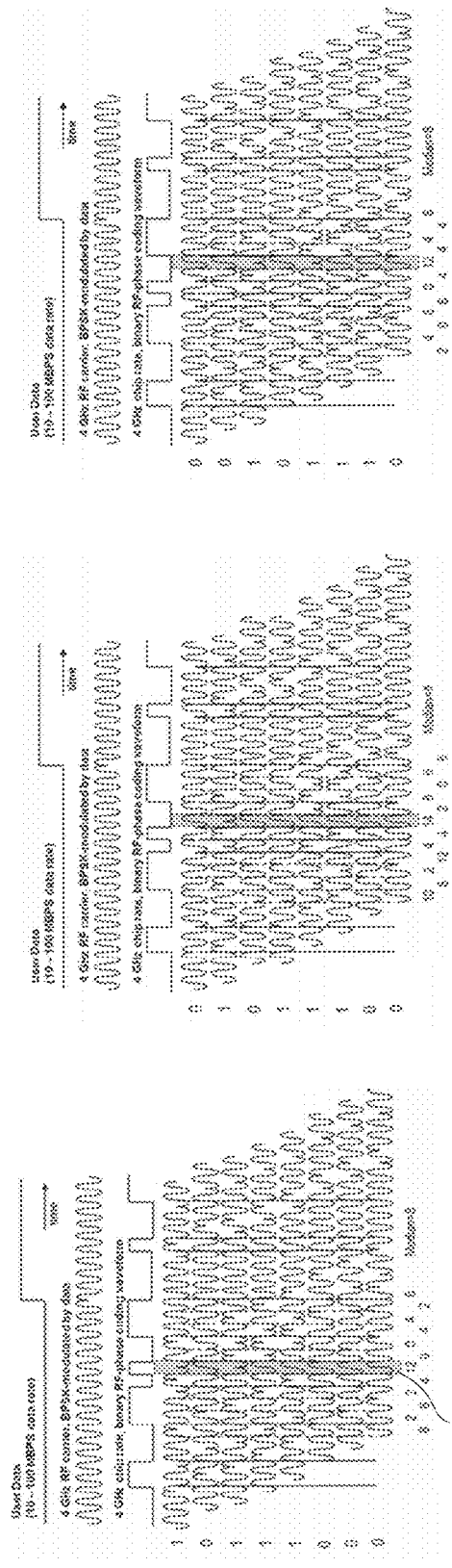

FIGS. 14A to 14D illustrate an example for which the chip-code interval is equal to the period of the RF carrier. In this case, one chip-code interval contains only two half-cycles of the RF-carrier waveform. FIGS. 14B to 14D show the N=8 decoder waveforms observed after the RF-phase reversing delays 144 for three successive chip intervals. The scores for these three chip intervals have values of 12 or 14, compared to a maximum value possible of 16, which is substantially greater than the median value of 8. The other score values indicated at the bottoms of FIGS. 14B to 14D actually are not observed by the decoder, since the phase-reversing code controlling the delay units 144 are changed from one chip interval to the next. Nevertheless, those score value provide some indication of the "randomness" of those other portions of the waveforms when the corrections applied by the RF-phase reversing delays 144 do not fully match the code on those waveforms. In general, the score values for those other chip intervals is lower than the score value for the phase-corrected chip interval, which is highlighted for example in FIG. 14B by the vertical bar 304.

FIGS. 15A to 15F illustrate another encoded waveform. For this example, the chip-code interval is 2.5 times longer than a period of the RF carrier. FIG. 15B shows the waveforms in the N decoder channels after those waveforms are shifted by increasing multiples of a code-chip interval. FIG. 15C shows the waveforms output from the chip-delay units 142 after the time delays are adjusted to be multiples of the RF-carrier period. The delay values (in units of RF-carrier period) are indicated at the right of FIGS. 15B and 15C. For this example, N=6. Since the chip-code interval is not an even multiple of the RF-carrier period, the relative time stagger between the N=6 waveforms illustrated in FIG. 15C is not uniform. The allowable values for the chip-defining delays 142 must be a multiple of the RF carrier period (i.e., the carrier period is the modulus of the possible delays produced by units 142) for the N=6 RF waveforms in the N decoder channels to sum properly. In essence, the delays produced by units 142 are a combination of chip-interval delays, as shown in FIG. 15B, and adjustments in delay used to align the chip to the RF carrier periods.

FIG. 15D shows the N=6 waveforms at one exemplary code-chip interval after the phase-reversing delays 144. For this example, the score is 22, much higher than the median value of 15. FIG. 15E shows another alignment of the N=6 waveforms at the next code-chip interval. For this other example, the score is 26 (compared to a maximum value possible of 30). Considering these scores, a reasonable choice for the equivalent threshold value set in code-match detect circuit may be 20, with scores below this threshold indicating the absence of a correct code match.

FIG. 15F illustrates the effect of a data-bit boundary on the operation of the decoder 36. If the portion of the chip-code waveform being considered (i.e., including those chips within the observation window) straddles a data-bit boundary at which a transition in data-bit value has occurred, the phase of some signal-waveform copies may include a phase change due to the change in data-bit value. The decoder cannot discern between a phase-change due to the data modulation and a phase-change due to the chip encoding. For this case, the score value is below the median.

Figure 11:
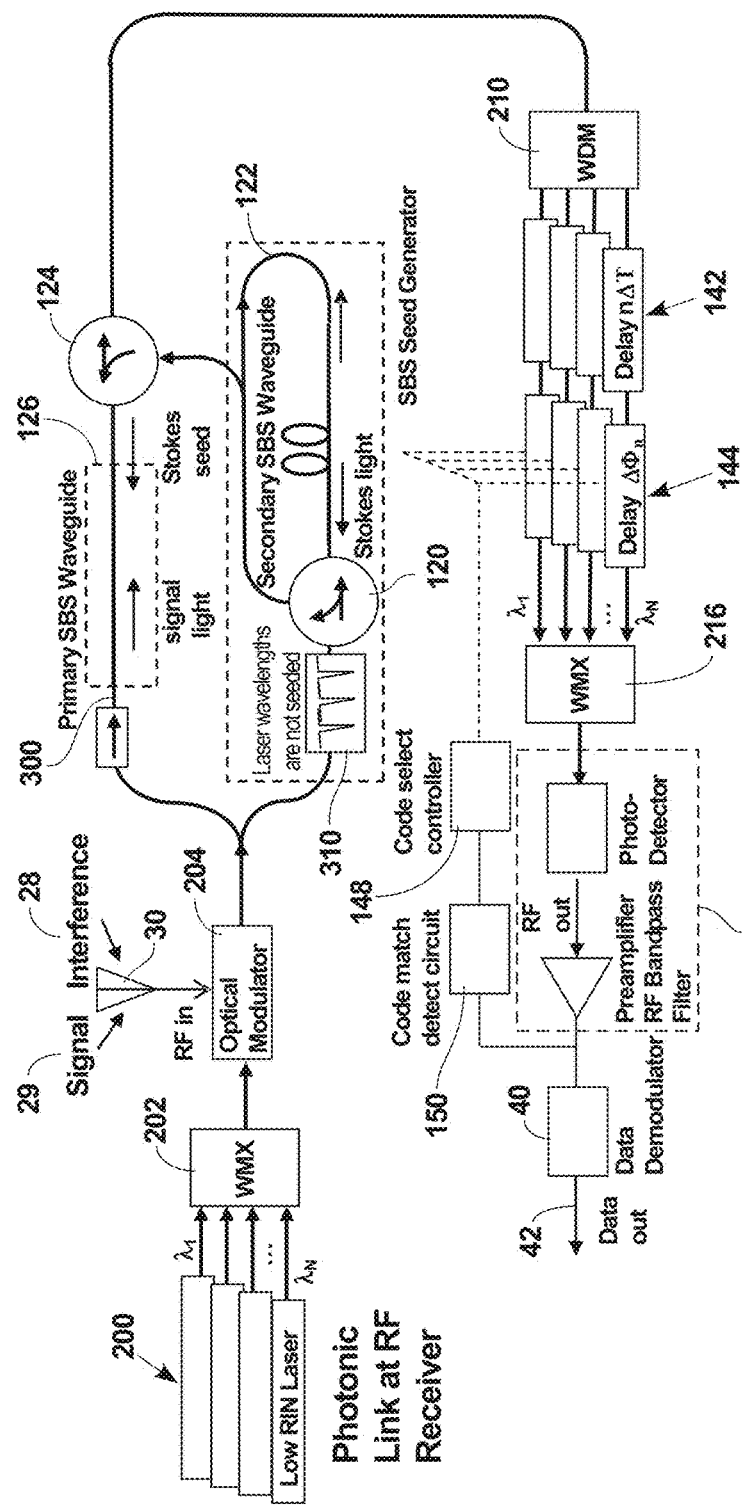
FIG. 11 shows an RF receiver that has multiple wavelengths of laser light to provide multiple-wavelength optical carriers coupled to the optical modulator in accordance with the present disclosure.

FIG. 11 illustrates an RF receiver that has multiple wavelengths of laser light, or a multiple-wavelength optical carrier from lasers 200 coupled to the optical modulator 204. Instead of a simple 1×N splitter 140 in FIG. 9, this receiver has an optical wavelength multiplexer (WMX) 202. And, instead of the simple N×1 combiner 146 in FIG. 9, this receiver has an optical wavelength demultiplexer (WDM) 210. The N different wavelengths of optical carrier can be produced by N separate lasers 200, as illustrated in FIG. 11. In general, these optical wavelengths or frequencies are different and are separated by an amount that is much greater than both the maximum bandwidth of the encoding in the time-delay modulating photonic link 16 and the maximum frequency of RF carrier 12. For example, the frequency difference between the light from two lasers 200 may be 100 GHz and the maximum RF frequency modulated onto the laser carriers may be smaller than 10 GHz.

The light from the multiple lasers is combined by means of an optical wavelength multiplexer (WMX) 202 and then those multiple optical carriers are supplied to the optical modulator 204. The frequency spread RF signal 29 and the RF interference 28 then modulate all N frequencies of optical carriers. For each optical carrier from the lasers 200, the optical spectrum at the output of the optical modulator 204 and also at the input to the subsequent photonic limiter, which is point 300, is similar to the spectra 100 depicted in FIG. 6A. The photonic limiter 34 depicted in FIG. 11 is similar to the photonic limiter 34 shown in FIG. 7; however, a key difference is that the optical filter 310 in its SBS seed generator has multiple notches to attenuate each of the multiple optical-carrier 200 frequencies. Thus, none of the optical carriers from lasers 200 produce a Stokes seed in the secondary SBS waveguide 122. As a result, the modulation sidebands associated with the strong interferers 28 that are modulated onto each of the optical carriers are attenuated in the primary SBS waveguide 126 but the optical carriers themselves are not attenuated or are only minimally attenuated in the primary SBS waveguide 126. An optical filter 310 having a periodic attenuation response can be achieved by using an optical resonator whose free-spectral range matches the frequency difference of the optical carriers from lasers 200.

The photonic decoder 36 of the receiver depicted in FIG. 11 operates in a similar way to the photonic decoder 36 illustrated in FIG. 9. The optical wavelength demultiplexer (WDM) 210 separates the output of the photonic limiter 34 into N paths, with the optical carrier and associated modulation sidebands for different lasers being directed into different ones of the N paths. After the first, chip-aligning delays 142 and the second, phase-shift-reversing delays 144 are applied, the light in those N paths are combined together by the optical wavelength multiplexer (WMX) 216. When N is large, the optical wavelength multiplexer 216 may have lower excess loss than a simple N×1 combiner. The descriptions given above regarding the functions of the first and second sets of delay units 142 and 144 and the functions of the photo-receiver 38 of FIG. 9 also apply to the functions of the corresponding components 142, 144 and 38 in the RF receiver of FIG. 11. The result is the recovery of the RF signal 29 and the attenuation of the interference 28.

Figure 12:
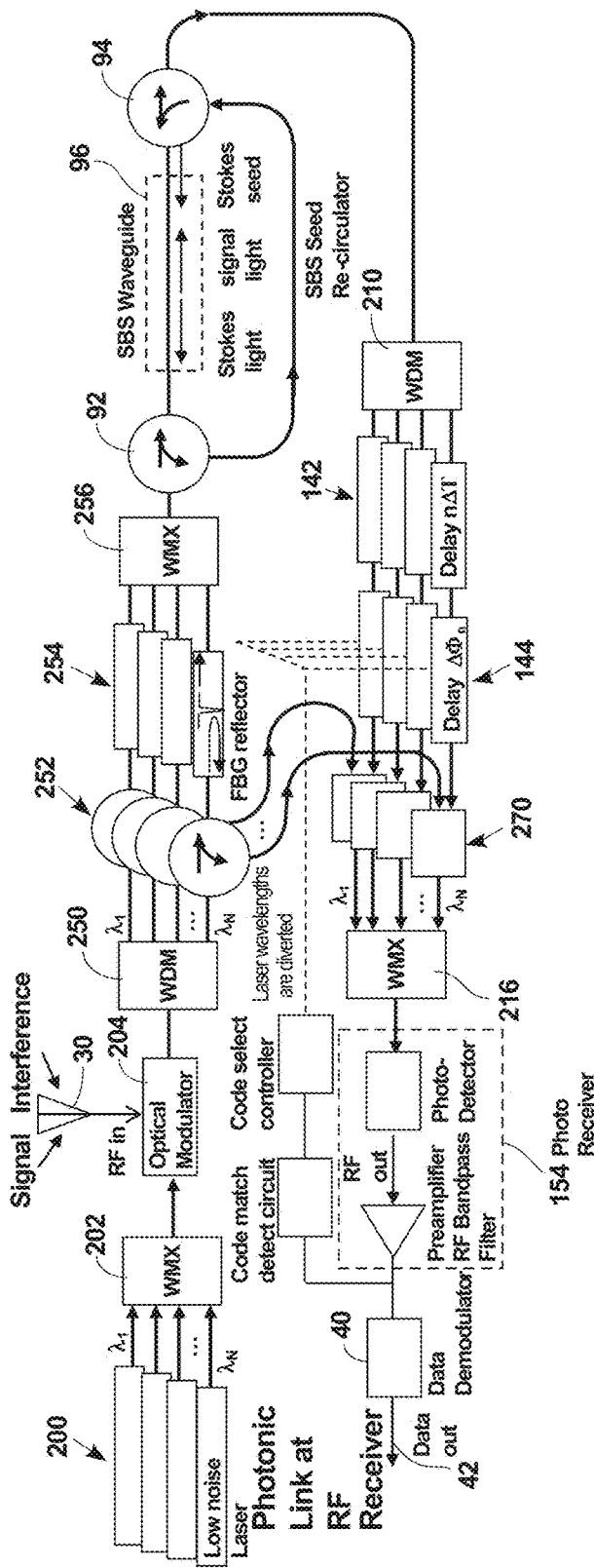
FIG. 12 shows another RF receiver that has multiple optical carriers of different frequencies or wavelengths coupled to the optical modulator, the photonic limiter and the photonic decoder in accordance with the present disclosure.

FIG. 12 illustrates another RF receiver that has multiple optical carriers 200 of different frequencies or wavelengths coupled to the optical modulator 204, the photonic limiter 34 and the photonic decoder 36. For this example, the various optical carriers 200 are extracted and are diverted away from the photonic limiter 34 and then those optical carriers 200 are re-combined with the decoded modulation sidebands for the RF signal and the limited and frequency-spread modulation sidebands for the interference prior to the photo-receiver 38 of the photonic decoder 36.

As depicted in FIG. 12, the optical carriers 200 are combined in a WMX 202 and are input to optical modulator 204, which modulate those optical carriers 200 according to the RF input from antenna 30. The output of the optical modulator 204 is separated by a wavelength demultiplexer (WDM) 250 into N paths with a different optical carrier and its associated modulation sidebands routed into each of N paths. A wavelength-selective optical reflector 254 in each path reflects the optical carrier but transmits the modulation sidebands. The reflected optical carriers are directed through optical circulators 252 to optical combiners 270 that are located following the two sets of delays 142 and 144 in the photonic decoder 36 portion of this receiver. The modulation sidebands, minus their optical carriers, are then combined together by WMX 256 before being directed to the SBS waveguide 96 of the photonic limiter 34 portion of the assembly. A recirculated SBS seed is depicted coupled via optical couplers 92 and 94 around the SBS waveguide 96 in FIG. 12. This photonic limiter 34 is similar to the one illustrated in FIG. 5 but the filter 95 in the SBS seed re-circulation path is not needed since the optical carrier bypasses the SBS waveguide 96. Other variations of photonic limiter 34 could be used. For example, a secondary SBS waveguide similar to the one illustrated in FIG. 7 or FIG. 11 also could be used to produce the SBS seed that is injected into the primary SBS waveguide 96. Because the modulation sidebands associated with the various optical carriers are separated in frequency by values greater than the Brillouin gain bandwidth of the SBS waveguide 96, shown in FIG. 12, or SBS waveguides 122 and 126, as shown in FIGS. 7 and 11, the SBS waveguides treat those modulation sidebands independently. This is one of the advantageous features of using SBS to attenuate the strong-interferer sidebands modulated onto multiple optical carriers having different carrier-frequency or wavelength values.

The wavelength demultiplexer 210 following the SBS limiter portion 34 separates the various modulation sidebands associated with the different optical carriers into N different paths. A set of code-chip selecting delays 142 are applied. Also, a set of phase-shift code reversing delays 144 are applied. The delays 142 and 144 function in the same way as the corresponding delays of the photonic decoder 36 portion of the RF receiver illustrated in FIG. 9. The outputs of delays 144 are input to combiner 270 which combines the outputs of delays 144 with the corresponding optical carriers. The output of combiner 270 is input to wavelength multiplexer 216, which combines the light from the N paths into an output path that is directed to photo-detector 154 of photo-receiver 38. The functions of that photo-receiver 38 have been described in the discussions pertaining to FIGS. 9 and 11.

Prior to the final wavelength multiplexer 216, the delayed modulation sidebands in each of the paths are combined with their associated optical carriers by the set of 2×1 optical combiners 270. With the receiver configuration of FIG. 12, the various optical carriers completely bypass the photonic limiter 34 portion and also the phase-decoding delay portion 36 of the receiver. Since the intensity of the modulation sidebands, even those sidebands associated with the strong interferers 28, is typically much weaker than the intensity of the optical carriers from lasers 200, the SBS threshold can be set much lower in both a primary and secondary SBS waveguides, such as primary and secondary SBS waveguides 122 and 126, respectively, when the optical carriers are absent. Also, since the optical carriers undergo very little attenuation, the net RF-signal output from the photo-receiver 38 can be stronger, thereby improving the overall signal to noise performance of the RF receiver.

Figure 16:
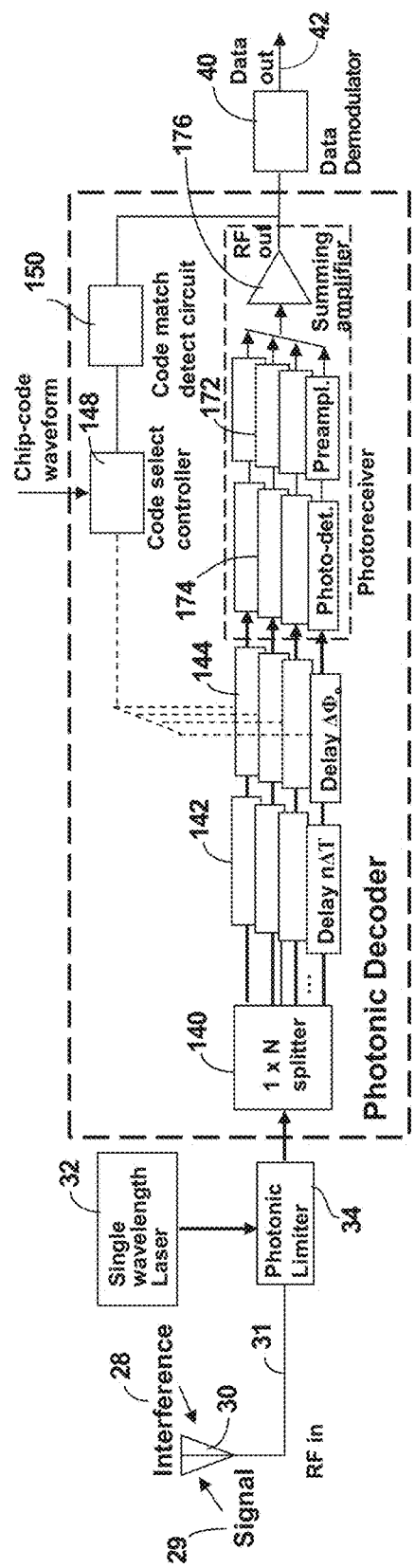
FIG. 16 shows another RF receiver in accordance with the present disclosure.

FIG. 16 shows an RF receiver that has a single-wavelength optical carrier, similar to the receiver of FIG. 9. However, instead of the N×1 optical combiner 146 in FIG. 9, this receiver uses an electronic combiner that can be implemented with an electronic summing amplifier 176. The optical output from the N delays 144 are coupled to a set of N photo-detectors 174. The electrical outputs from these photo-detectors 174 are then coupled to a set of N electronic preamplifiers 172. The electrical currents output from the N electronic preamplifiers 172 are then combined at a current summing junction for summing amplifier 176 (the summing junction is depicted explicitly in this figure). The RF bandpass filtering function can be implemented in the photo-detectors 174, preamplifiers 172 or summing amplifier 176, or in a combination of those components. The photo-receiver 38 of this photonic decoder can be considered as including photo-detectors 174, preamplifiers 172 and summing amplifier 176. Provided the summing amplifier has sufficient compliance and also sufficiently low impedance for the desired bandwidth and RF-carrier frequency, this electronic summing approach can avoid the losses associated with a typical optical-waveguide combiner.

A combination of the RF-receiver designs of FIGS. 5 through 16 could be used to increase the number N of chips observed simultaneously by the photonic decoder. Such a combination could be used to mitigate the constraints limiting each of the designs. For example, the optical combiner loss of the design of FIG. 9, the high laser power for each of the multiple lasers in the designs of FIGS. 11 and 12 and also the optical-power handling capability required of the optical modulator of those designs, and the voltage compliance needed for the design of FIG. 16 could be balanced to achieve an optimal solution.

There can be numerous other variations of the RF receiver and the RF transmitter of the interference suppressing RF link of the present disclosure. These variations can be obtained by combining different selected features of the examples described above. The examples provided are non-limiting and intended to illustrate the key features so that variations can be conceived and designed.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A radio frequency (RF) link comprising:
    a link transmitter comprising:
        a data modulator for modulating a data waveform together with an RF carrier;
        a photonic encoder coupled to the data modulator; and
        a transmitter antenna for transmitting an RF signal, wherein the RF signal comprises an output of the photonic encoder; and
    a link receiver comprising:
        a receiver antenna for receiving the RF signal;
        a first laser source;
        a photonic limiter coupled to the first laser source and to the receiving antenna;
        a photonic decoder coupled to the photonic limiter;
        a photo-receiver coupled to the photonic decoder; and
        a demodulator coupled to the photo-receiver for demodulating an output of the photo-receiver with the RF carrier to form a data output;
    wherein the photonic limiter comprises:
        an optical modulator coupled to the first laser source and to the receiver antenna;
        a primary stimulated Brillouin scattering (SBS) waveguide having a first end and a second end opposite the first end;
        wherein the first end of the primary stimulated Brillouin scattering (SBS) waveguide is coupled to the optical modulator, and
        wherein the second end of the primary stimulated Brillouin scattering (SBS) waveguide is coupled to the photonic decoder.

2. The radio frequency (RF) link of claim 1 wherein the photonic encoder comprises:
    a second laser;
    an optical modulator or an optical splitter coupled to the second laser and to the output of the data modulator;
    a first switch coupled to the optical modulator and to a chip-code waveform source for switching the first switch;
    a plurality of RF phase shift selectors for providing a plurality of RF carrier phase shifts, each RF phase shift selector coupled to the first switch;
    a second switch coupled to the chip-code waveform source for switching the second switch, and coupled to each RF phase shift selector; and
    a photo-detector coupled to the second switch.

3. The radio frequency (RF) link of claim 2 wherein each RF phase shift selector comprises:
    a plurality of optical time delays for providing 0-degrees, and 180-degrees of relative phase shift of the RF carrier.

4. The radio frequency (RF) link of claim 2 wherein each RF phase shift selector comprises:
    a plurality of optical time delays for providing −180-degrees, 0-degrees, 0-degrees and +180-degrees of relative phase shift of the RF carrier.

5. The radio frequency (RF) link of claim 1 wherein the photonic limiter further comprises:
    a first optical coupler coupled to the optical modulator and to the first end of the primary stimulated Brillouin scattering (SBS) waveguide;
    a first optical filter coupled to the first optical coupler; and
    a second optical coupler coupled to the first optical filter and to the second end of the primary stimulated Brillouin scattering (SBS) waveguide;
    wherein an output of the second optical coupler is coupled to the photonic decoder.

6. The radio frequency (RF) link of claim 1 wherein the photonic limiter further comprises:
    a first optical filter coupled to the optical modulator;
    a first optical coupler coupled to the first optical filter;
    a secondary stimulated Brillouin scattering (SBS) waveguide having a first end and a second end;
    wherein the first end of the secondary stimulated Brillouin scattering (SBS) waveguide is coupled to the first optical coupler;
    wherein the second end of the secondary stimulated Brillouin scattering (SBS) waveguide is coupled to the first optical coupler; and
    a second optical coupler coupled to the secondary stimulated Brillouin scattering (SBS) waveguide and to the second end of the primary stimulated Brillouin scattering (SBS) waveguide;
    wherein an output of the second optical coupler is coupled to the photonic decoder.

7. The radio frequency (RF) link of claim 1 wherein the photonic limiter further comprises:
    a first optical coupler coupled to the optical modulator;
    a first optical filter coupled to the first optical coupler;
    wherein the first end of the primary stimulated Brillouin scattering (SBS) waveguide is coupled to the first optical filter;
    a second optical filter coupled to the optical modulator;
    a second optical coupler coupled to the second optical filter;
    a secondary stimulated Brillouin scattering (SBS) waveguide having a first end and a second end;
    wherein the first end of the secondary stimulated Brillouin scattering (SBS) waveguide is coupled to the second optical coupler and the second end of the secondary stimulated Brillouin scattering (SBS) waveguide is coupled to the second optical coupler;
    a third optical coupler coupled to the secondary stimulated Brillouin scattering (SBS) waveguide and to the second end of the primary stimulated Brillouin scattering (SBS) waveguide;
    a laser wavelength transmitting filter coupled to the first optical coupler; and a combiner coupled to an output of the laser wavelength transmitting filter and coupled to the third optical coupler;

wherein an output of the combiner is coupled to the photonic decoder.

8. The radio frequency (RF) link of claim 1 wherein the photonic decoder comprises:

a 1 to N splitter coupled to the photonic limiter;

N first optical delays, wherein the nth first optical delay has a value derived from n×ΔT, where ΔT is a code-chip interval;

wherein a time-staggered serial-to-parallel conversion achieved by the 1×N splitter and the N first optical delays enable simultaneous extraction of a subset of N successive code-chips out of a total of M code-chips in an encoded waveform, and wherein the nth first optical delay views an $(m+n)^{th}$ code-chip of a code-chip waveform;

N second optical delays, wherein the nth second optical delay has a value that is an inverse of a time-delay code for a $(m+n)^{th}$ chip of the code chip waveform; and a photo-receiver.

9. The radio frequency (RF) link of claim 8:

wherein each first optical delay of the N first optical delays in the photonic decoder is coupled to the 1 to N splitter;

wherein the nth second optical delay of the N second optical delays is coupled to the nth first optical delay of the N first optical delays a N to 1 combiner; and wherein the N second optical delays are coupled to the N to 1 combiner and wherein an output of the N to 1 combiner is coupled to the photo-receiver.

10. The radio frequency (RF) link of claim 8 further comprising:

a code match detect circuit coupled to the photo-receiver; and a code select controller coupled to the code match detect circuit and to the N second optical delays.

11. The radio frequency (RF) link of claim 8:

wherein the N second optical delays of the photonic decoder are coupled to the 1 to N splitter;

wherein the nth second optical delay of the N second optical delays is coupled to the nth first optical delay of the N first optical delays;

wherein a N to 1 combiner is coupled to the N first optical delays; and wherein an output of the N to 1 combiner is coupled to the photo-receiver.

12. The radio frequency (RF) link of claim 8 wherein the photo-receiver of the photonic decoder comprises:

a photodetector; and a RF bandpass filter.

13. The radio frequency (RF) link of claim 8 wherein the photo-receiver of the photonic decoder comprises:

N photo-detectors, wherein the nth photo-detector is coupled to the nth second optical delay of the N second optical delays;

N preamplifiers, wherein the nth preamplifier is coupled to the nth photo-detector; and a summing amplifier coupled to each of the N preamplifiers.

14. The radio frequency (RF) link of claim 1 wherein the first laser source comprises:

a plurality of lasers, each laser having a different wavelength of laser light; and a first optical wavelength multiplexer(WMX) coupled to the plurality of lasers;

wherein the photonic limiter comprises an optical modulator;

wherein the optical modulator modulates an output of the first optical WMX with an RF signal and with an interferer and produces for each laser wavelength modulation sidebands associated with the RF signal and modulation sidebands associated with the interferer; and wherein for each laser wavelength the photonic limiter attenuates the modulation sidebands associated with the interferer by a greater amount than the photonic limiter attenuates the modulation sidebands associated with the RF signal.

15. The radio frequency (RF) link of claim 14 further comprising:

an optical wavelength demultiplexer(WDM) coupled to the photonic limiter, the optical WDM having a plurality of outputs, each output corresponding to one of the wavelengths of laser light; and a second optical wavelength multiplexer(WMX) coupled to the photo-receiver;

wherein the optical wavelength demultiplexer(WDM) is coupled to the N first optical delays or to the N second optical delays;

wherein the second optical wavelength multiplexer (WMX) is coupled to the N first optical delays or to the N second optical delays; and wherein each optical delay of the N first optical delays or of the N second optical delays receives a different wavelength of laser light.

16. A link receiver comprising:

a receiver antenna for receiving the RF signal;

a first laser source;

a photonic limiter coupled to the first laser source and to the receiving antenna;

a photonic decoder coupled to the photonic limiter;

a photo-receiver coupled to the photonic decoder; and a demodulator coupled to the photo-receiver for demodulating an output of the photo-receiver with the RF carrier to form a data output;

wherein the photonic limiter comprises:

an optical modulator coupled to the first laser source and to the receiver antenna;

a primary stimulated Brillouin scattering (SBS) waveguide having a first end and a second end opposite the first end;

wherein the first end of the primary stimulated Brillouin scattering (SBS) waveguide is coupled to the optical modulator, and wherein the second end of the primary stimulated Brillouin scattering (SBS) waveguide is coupled to the photonic decoder.

17. The link receiver of claim 16 wherein the photonic limiter further comprises:

a first optical coupler coupled to the optical modulator;

a first optical filter coupled to the first optical coupler;

wherein the first end of the primary stimulated Brillouin scattering (SBS) waveguide is coupled to the first optical filter;

a second optical filter coupled to the optical modulator;

a second optical coupler coupled to the second optical filter;

a secondary stimulated Brillouin scattering (SBS) waveguide having a first end and a second end;

wherein the first end of the secondary stimulated Brillouin scattering (SBS) waveguide is coupled to the second optical coupler and the second end of the secondary stimulated Brillouin scattering (SBS) waveguide is coupled to the second optical coupler;
a third optical coupler coupled to the secondary stimulated Brillouin scattering (SBS) waveguide and to the second end of the primary stimulated Brillouin scattering (SBS) waveguide;
a laser wavelength transmitting filter coupled to the first optical coupler; and
a combiner coupled to an output of the laser wavelength transmitting filter and coupled to the third optical coupler;
wherein an output of the combiner is coupled to the photonic decoder.

18. The link receiver of claim 16 wherein the photonic decoder comprises:
a 1 to N splitter coupled to the photonic limiter;
N first optical delays, wherein the nth first optical delay has a value derived from n×ΔT, where ΔT is a code-chip interval;
wherein a time-staggered serial-to-parallel conversion achieved by the 1×N splitter and the N first optical delays enable simultaneous extraction of a subset of N successive code-chips out of a total of M code-chips in an encoded waveform, and wherein the nth first optical delay views an $(m+n)^{th}$ code-chip of a code-chip waveform;
N second optical delays, wherein the nth second optical delay has a value that is an inverse of a time-delay code for a $(m+n)^{th}$ chip of the code chip waveform; and
a photo-receiver.

19. The link receiver of claim 18:
wherein each first optical delay of the N first optical delays in the photonic decoder is coupled to the 1 to N splitter;
wherein the nth second optical delay of the N second optical delays is coupled to the nth first optical delay of the N first optical delays a N to 1 combiner; and
wherein the N second optical delays are coupled to the N to 1 combiner and wherein an output of the N to 1 combiner is coupled to the photo-receiver.

20. The link receiver of claim 18 further comprising:
a code match detect circuit coupled to the photo-receiver; and
a code select controller coupled to the code match detect circuit and to the N second optical delays.

21. The link receiver of claim 18:
wherein the N second optical delays of the photonic decoder are coupled to the 1 to N splitter;
wherein the nth second optical delay of the N second optical delays is coupled to the nth first optical delay of the N first optical delays;
wherein a N to 1 combiner is coupled to the N first optical delays; and
wherein an output of the N to 1 combiner is coupled to the photo-receiver.

22. The link receiver of claim 18 wherein the photo-receiver of the photonic decoder comprises:
a photodetector; and
a RF bandpass filter.

23. The link receiver of claim 18 wherein the photo-receiver of the photonic decoder comprises:
N photo-detectors, wherein the nth photo-detector is coupled to the nth second optical delay of the N second optical delays;
N preamplifiers, wherein the nth preamplifier is coupled to the nth photo-detector; and
a summing amplifier coupled to each of the N preamplifiers.

24. The link receiver of claim 16 wherein the first laser source comprises:
a plurality of lasers, each laser having a different wavelength of laser light; and
a first optical wavelength multiplexer(WMX) coupled to the plurality of lasers;
wherein the photonic limiter comprises an optical modulator;
wherein the optical modulator modulates an output of the first optical WMX with an RF signal and with an interferer and produces for each laser wavelength modulation sidebands associated with the RF signal and modulation sidebands associated with the interferer; and
wherein for each laser wavelength the photonic limiter attenuates the modulation sidebands associated with the interferer by a greater amount than the photonic limiter attenuates the modulation sidebands associated with the RF signal.

25. The link receiver of claim 24 further comprising:
an optical wavelength demultiplexer(WDM) coupled to the photonic limiter, the optical WDM having a plurality of outputs, each output corresponding to one of the wavelengths of laser light; and
a second optical wavelength multiplexer(WMX) coupled to the photo-receiver;
wherein the optical wavelength demultiplexer(WDM) is coupled to the N first optical delays or to the N second optical delays;
wherein the second optical wavelength multiplexer (WMX) is coupled to the N first optical delays or to the N second optical delays; and
wherein each optical delay of the N first optical delays or of the N second optical delays receives a different wavelength of laser light.

26. A radio frequency (RF) transmitter comprising:
a data modulator for modulating a data waveform together with an RF carrier;
a photonic encoder coupled to the data modulator; and
a transmitter antenna for transmitting an RF signal, wherein the RF signal comprises an output of the photonic encoder;
wherein the photonic encoder comprises:
 a laser;
 an optical modulator or an optical splitter coupled to the laser and to the output of the data modulator;
 a first switch coupled to the optical modulator and to a chip-code waveform source for switching the first switch;
 a plurality of RF phase shift selectors for providing a plurality of RF carrier phase shifts, each RF phase shift selector coupled to the first switch;
 a second switch coupled to the chip-code waveform source for switching the second switch, and coupled to each RF phase shift selector; and
 a photo-detector coupled to the second switch.

27. The radio frequency (RF) transmitter of claim 26 wherein each RF phase shift selector comprises:
a plurality of optical time delays for providing 0-degrees, and 180-degrees of relative phase shift of the RF carrier.

28. The radio frequency (RF) transmitter of claim 26 wherein each RF phase shift selector comprises:

a plurality of optical time delays for providing −180-degrees, 0-degrees, 0-degrees and +180-degrees of relative phase shift of the RF carrier.

\* \* \* \* \*